United States Patent [19]
Bickerton et al.

[11] Patent Number: 6,041,312
[45] Date of Patent: Mar. 21, 2000

[54] OBJECT ORIENTED TECHNOLOGY FRAMEWORK FOR ACCOUNTS RECEIVABLE AND ACCOUNTS PAYABLE

[75] Inventors: Matthew John Bickerton, Stratford, United Kingdom; Kathryn Ann Bohrer, Austin, Tex.; Emma Suzanne Hughes, Dudley, United Kingdom; Edward William Kenworthy, Stratford upon Avon, United Kingdom; Rupert Jeremy Musgrove, Alcester, United Kingdom; LindaMay Rose Patterson, Rochester, Minn.; Steven Porter, Shaw, United Kingdom; David Dennis Salt, Prestbury, United Kingdom; Duncan Keith Scattergood, Boughton Hackett, United Kingdom

[73] Assignee: International Business Machines Corporation, Armonk, N.Y.

[21] Appl. No.: 08/834,647

[22] Filed: Mar. 28, 1997

[51] Int. Cl.[7] ............................. G06F 17/30; G06F 15/18
[52] U.S. Cl. .................................. 705/30; 705/8; 705/35; 705/36
[58] Field of Search .................................. 705/30, 8, 35, 705/36; 707/103, 100; 701/117; 395/500, 683, 682, 677, 673, 685, 200, 48, 701, 710, 703–705; 345/326, 335, 348

[56] References Cited

U.S. PATENT DOCUMENTS

| | | | |
|---|---|---|---|
| 4,943,932 | 7/1990 | Lark et al. | 706/60 |
| 5,057,996 | 10/1991 | Cutler et al. | 395/676 |
| 5,101,364 | 3/1992 | Davenport et al. | 345/328 |

(List continued on next page.)

OTHER PUBLICATIONS

Text of *IBM Technical Disclosure Bulletin*, vol. 37, DeBinder et al., Feb. 1994, "Results Folder Framework", pp. 431–432.

Text of *IBM Technical Disclosure Bulletin*, vol. 36, Coskun, N., Jun. 1993, "Persistent Framework Independent Record/Playback Framework", pp. 261–264.
Text of *IBM Technical Disclosure Bulletin*, Baker et al., Oct. 1991, "Model View Schema", pp. 321–322.
Text of *IBM Technical Disclosure Bulletin*, Baker et al., Oct. 1991, "Office Container Class", pp. 309–310.
Text of *IBM Technical Disclosure Bulletin*, Cavendish et al., Jul. 1991, "Icon Pane Class", pp. 118–119.
Text of *IBM Technical Disclosure Bulletin*, Baker et al., Jun. 1991, "Distribution List Class", p. 159.
Text of *IBM Technical Disclosure Bulletin*, Cavendish et al., Jun. 1991, "Object–Oriented Documentation Tool", pp. 50–51.
Text of *IBM Technical Disclosure Bulletin*, Allard et al., Feb. 1990, "Object–Oriented Programming in C—the Linnaeus System", pp. 437–439.

(List continued on next page.)

*Primary Examiner*—James P. Trammell
*Assistant Examiner*—Cuong H. Nguyen
*Attorney, Agent, or Firm*—David A. Hall; Owen J. Gamon

[57] ABSTRACT

An object oriented framework provides a set of objects that perform account management functioning and permits a framework user to add extensions to the framework for specific processing features, thereby producing an account management application program for managing the financial accounts of a company, including accounts receivable and accounts payable. The framework includes an Application category of classes that contains company information for general ledger processing, a Posting Combinations category of classes that define valid posting combinations for the general ledger, a Journals category of classes that create, process, validate, and post general ledger journals, a Bank Transactions category of classes that process bank statements, a Bank Statements and Reconciliation category of classes that reconcile bank statements with bank accounts, and a Closing category of classes that validate and close the current accounting period. These classes provide the base framework upon which an account management application program is developed by the framework user.

35 Claims, 33 Drawing Sheets

U.S. PATENT DOCUMENTS

| | | | |
|---|---|---|---|
| 5,119,475 | 6/1992 | Smith et al. | 345/353 |
| 5,122,959 | 6/1992 | Nathanson et al. | 701/117 |
| 5,181,162 | 1/1993 | Smith et al. | 707/530 |
| 5,195,172 | 3/1993 | Elad et al. | 706/62 |
| 5,226,191 | 7/1993 | Khoyi et al. | 395/705 |
| 5,247,693 | 9/1993 | Bristol | 395/705 |
| 5,249,270 | 9/1993 | Stewart et al. | 395/200.52 |
| 5,257,384 | 10/1993 | Farrand et al. | 395/285 |
| 5,261,080 | 11/1993 | Khoyi et al. | 395/500 |
| 5,274,572 | 12/1993 | O'Neill et al. | 702/57 |
| 5,276,775 | 1/1994 | Meng | 706/51 |
| 5,287,447 | 2/1994 | Miller et al. | 345/32 |
| 5,293,470 | 3/1994 | Birch et al. | 707/514 |
| 5,297,283 | 3/1994 | Kelly, Jr. et al. | 395/674 |
| 5,315,703 | 5/1994 | Matheny et al. | 345/507 |
| 5,367,633 | 11/1994 | Matheny et al. | 345/514 |
| 5,369,766 | 11/1994 | Nakano et al. | 395/685 |
| 5,379,430 | 1/1995 | Nguyen | 707/3 |
| 5,388,264 | 2/1995 | Tobias, II et al. | 707/103 |
| 5,390,325 | 2/1995 | Miller | 395/183.14 |
| 5,396,626 | 3/1995 | Nguyen | 395/701 |
| 5,398,336 | 3/1995 | Tantry et al. | 707/103 |
| 5,437,027 | 7/1995 | Bannon et al. | 707/103 |
| 5,544,302 | 8/1996 | Nguyen . | |
| 5,634,129 | 5/1997 | Dickinson . | |
| 5,701,400 | 12/1997 | Amado | 706/45 |
| 5,778,378 | 7/1998 | Rubin | 707/103 |

OTHER PUBLICATIONS

Text of *IBM Technical Disclosure Bulletin*, vol. 38, No. 1, Jan. 1995, pp. 411–414, J. Knapman "Generating Specific Server Programs in Distributed Object–Oriented Customer Information Control System".

Text of *IBM Technical Disclosure Bulletin*, vol. 37, No. 12, Dec. 1994, pp. 19–20, Al–Karmi et al., "Events Set for Event Tracing in Distributed Object–Oriented Systems".

Text of *IBM Technical Disclosure Bulletin*, vol. 37, No. 12, Dec. 1994, pp. 375–378, Acker et al., "Automatically Generating Formatted Documentation for Object–Oriented Class Libraries".

Text of *IBM Technical Disclosure Bulletin*, vol. 37, No. 11, Nov. 1994, pp. 71–72, Behrs et al., "Device Support Framework to Support ISO DPA 10175 and POSIX 1387.4".

Text of *IBM Technical Disclosure Bulletin*, vol. 37, No. 7, Jul. 1994, pp. 145–146, Banda et al., "Exception Management Algorithm for Multi–Threaded Method Invocation".

Text of *IBM Technical Disclosure Bulletin*, vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriened Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D005, S. Vinoski, 1994, "Mapping CORBA IDL Into C++".

Inspec Abstract No. C9501–7330–007, Salminen et al., 1994, "Modeling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Qingzhong et al., 1992, "An Object–Oriented Model for Intelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstact No. C9411–7100–029 from C. Le Pape, 1994, "Implementation of Resource Constraints in ILOG Schedule: A Library for the Development of Contraint–Based Scheduling Systems".

Inspec Abstract No. C9411–6115–035 from Mili et al., 1991, "SoftClass: An Object–Oriented Tool for Software–Reuse".

Inspec Abstract No. C9410–6180G–015, from Eichelberg et al., 1993, "Integrating 3D–Graphics into an Object–Oriented Application Framework".

Inspec Abstract No. B9409–6120M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirkbauer et al., 1994, "Object–Oriented Process Control Software".

Inspec Abstract No. C9408–6110J–011 from Gyu–Chung et al., 1993, "System Methodologies of Object–Oriented Programs".

Inspec Abstract No. C9407–7420D–045, from Desai et al., 1994, "Controller Structure Definition Via Intelligent Process Control".

Inspec Abstract No. C9407–6140D–014, from Satoh et al., 1994, "Semantics from a Real–Time Object–Oriented Programming Language".

Inspec Abstract No. C9406–6150N–015, from Schmidt et al., 1994, "The Service Configurator Framework: An Extensible Architecture from Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework from Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186 from Righter et al., 1994, "An Object–Oriented Characterization of Spatial Ecosystem Information".

Inspec Abstract No. C9412–6160J–025 from J. Iivari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No.4664213, "Maintaining Information about Persistent Replicated Objects in a Distributed System"., 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from, J.D. Grimes, 1993, "Objects 101—An Implementation View", Proceedings of C++ World 1993.

Inspec Abstract No. 4647921, from Uhorchak et al., 1993, "An Object–Oriented Class Library for Creating Engineering Graphs Using PHIGS".

Inspec Abstract No. 4642214, from, Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 4616931, from, Islam et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al, 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in Logidata+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inpsec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt, et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems.".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C9204–6110J–017, "Choices Frameworks and Refinement", R.H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD environment".

Inspec Abstract No. 4050569, from Di Giovanni et al., 1990, "HOOD Nets".

Inspec Abstract No. C91072815, from Holtkamp et al., 1990, "DEMOM–A Description Based Media Object Data Model".

Inspec Abstract No. C91072016, from A. Lane, 1991, "/DOS/C++—Application Frameworks".

Inspec Abstract No. C91072574, from Hemery et al., "An Analysis of Communications and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Progamming Environment Into ET++—A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specifications in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No. C89014870, from R. King, 1988, "Semantic and Object–Oriented Database Support for Software Environments".

Inspec Abstract No. C89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C8807447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga,, 1985, "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

OBJECT ORIENTED TECHNOLOGY FRAMEWORK FOR ACCOUNTS RECEIVABLE AND ACCOUNTS PAYABLE

BACKGROUND OF THE INVENTION

1. Field of the Invention

This invention relates generally to data processing systems and, more particularly, to object oriented programming systems and processes.

2. Description of the Related Art

Computer programs have typically been developed using procedural programming techniques. Procedural programming techniques emphasize structuring the data processing procedures to which data values are subjected. Efforts to reduce long software development times and high software maintenance costs have resulted in structured programming techniques that attempt to reuse blocks of programming code. For example, tasks or processes that must be repeated can be written as system programming routines or program library functions. Program developers then provide an application program to accomplish a desired result using calls to the system routines and library functions.

System routines and library functions provide only a limited reduction in software development time and maintenance costs. Once a procedural application program is written, it is relatively difficult to incorporate new features or additional data types. There are many processes in an application program that cannot be easily extracted from program code and reused. Additional data types often cannot be inserted into procedural program code without extensive rewriting of the original program code. Thus, even if new features in a program can be implemented using processes similar to those already in the application, the programming for such processes must be largely duplicated, with slight modifications, to provide the new features. This increases program development time. Moreover, if such programs must operate with other applications, it can be difficult to ensure that the changes will interface properly.

Another problem confronting program developers is that of providing program versions capable of operating with the various platforms used by customers. The different platforms encompass different operating systems as well as different companion applications with which the application must interface. With respect to operating systems, for example, a program developer might have to write different versions for satisfactory operation under the "Windows 95" operating system by Microsoft Corp., the UNIX system, the "MacIntosh" operating system by Apple Computer Corp., or the "OS/2" operating system by International Business Machines Corporation (IBM Corporation). In a similar fashion, a program developer might want to provide the ability to interface with application programs such as word processor programs, spreadsheet programs, and the like, meaning that the program developer must provide the ability to accept files (and produce files) in different file formats. Different platforms use different data formats and procedural operations, so program developers must provide different program versions or routines for each platform.

Object oriented programming (OOP) techniques encapsulate, or bind together, data and the methods that operate on them. This permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of application developers and limit program reuse among different classes.

OOP frameworks have been developed in an effort to further reduce program development costs. A framework is a set of OOP classes that embodies a predetermined set of attributes and methods for providing a common group of behaviors. An application program developer utilizes the framework and builds upon it, adding subclasses and attributes and modifying methods depending on the problem to be solved. Such changes to the framework are typically referred to as framework extensions, and are made possible by the OOP notions of inheritance and polymorphism. The challenge confronting framework developers, then, is to arrive at a set of classes and methods that will best provide the desired problem solution and will accept the most likely framework extensions. Thus, the designer of a framework must carefully assess what framework users will most likely need in the way of classes and attributes.

From the discussion above, it should be apparent that there is a need for an application program development tool that permits application program developers to more quickly develop and more easily maintain business financial applications such as accounts receivable and accounts payable software. The present invention fulfills this need.

SUMMARY OF THE INVENTION

In accordance with the present invention, a reusable object oriented (OO) framework for use with object oriented programming systems comprises an account management shell that provides a framework user with a set of accounts receivable and accounts payable (AR/AP) classes that can perform account management functioning and permit the framework user to add extensions to the framework for specific processing features, thereby producing an AR/AR ledger application program for account management of a company. In this way, the AR/AP ledger account management framework provides a base set of classes on which program developers can build additional specific features they deem important.

The framework includes classes for which it is anticipated extension subclassing with new attributes and methods will occur. An application program developer can customize the extension classes to meet the needs of application users and create all user interfaces with the application program, permitting the developer to more quickly conclude program development. The end-user interface establishes a means for the end-user to communicate with the application program to receive, process, and report data. The framework frees the program developer to concentrate on application program features, which can easily be implemented by extending the OO classes and methods of the OO framework. The framework thereby provides a base from which a variety of AR/AP ledger account management application programs can be quickly and efficiently produced.

The AR/AP ledger framework includes classes that define ongoing activities, perform payment handling functions, and that manage credit control operations. The ongoing activities generally may be described as either item entry, item maintenance, log item maintenance, or statement-related activities. The payment handling functions include payments, allocations, and collection documents. The credit control operations include tabulation of interest charges, legal debtor accounting, credit statistics, and "chase" letters.

Other features and advantages of the present invention should be apparent from the following description of the preferred embodiment, which illustrates, by way of example, the principles of the invention.

DESCRIPTION OF THE PREFERRED EMBODIMENT

1. Application Program Development

Figure 1:
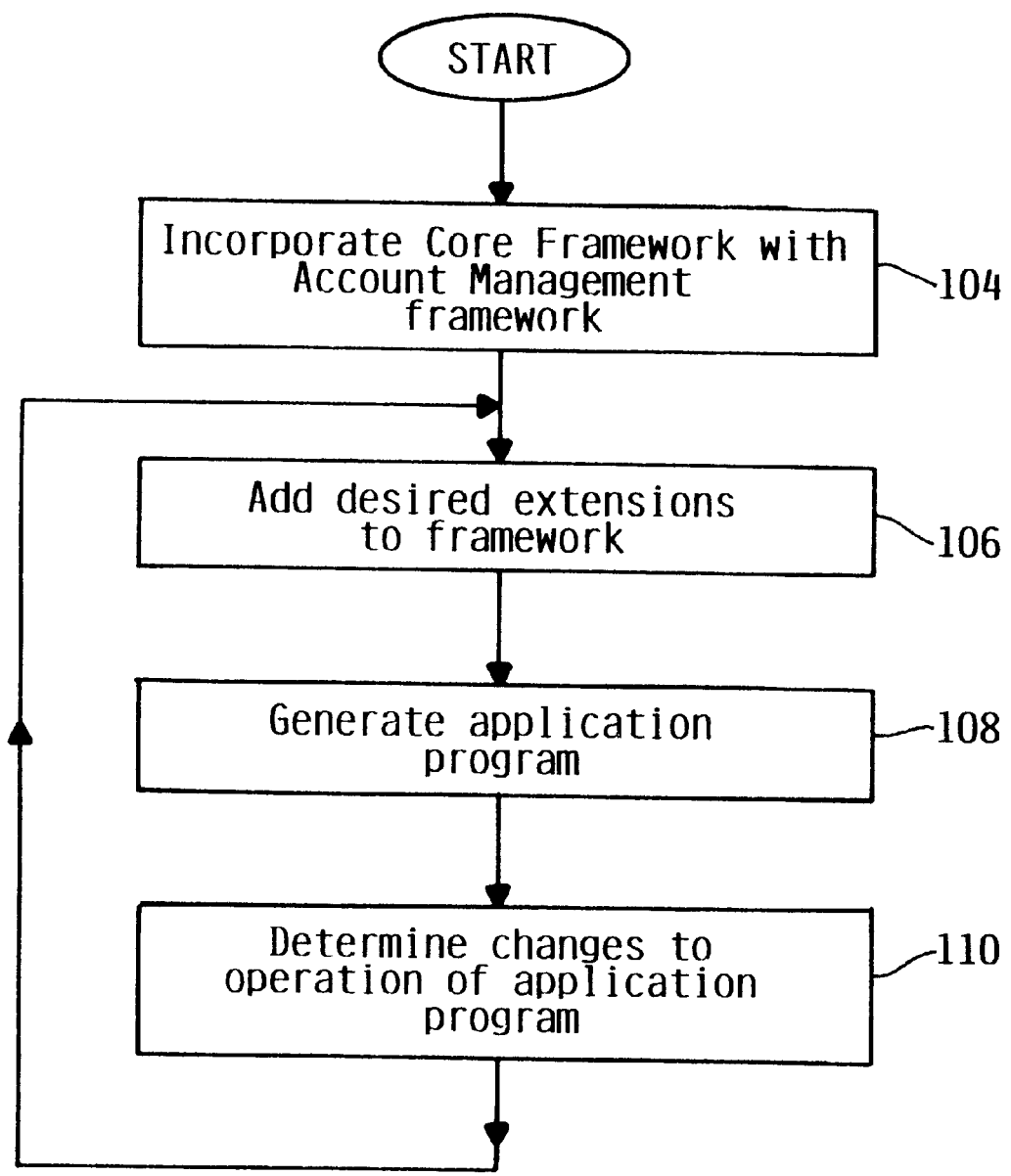
FIG. 1 is a flow diagram representation of the application development process that users of the framework will follow to provide an A/R and A/P ledger application program.

FIG. 1 is a flow diagram representation of the steps performed with a computer system to produce an accounts receivables/accounts payable (AR/AP) ledger business financials application program using the framework of the present invention. The AR/AP ledger framework of the preferred embodiment is designed to obtain certain information from objects of related core classes. Such information will include information concerning the company for which the account management is to be performed, as well as other information needed to carry out operating in a computer system. These core classes can be organized into a core framework (CF) that is complementary to the framework of the present invention.

The application developer provides a user interface and combines operating interface features of the core object classes with the structure and functionality of the AR/AP Ledger OOP framework constructed in accordance with the present invention, and also adds particular framework extensions as needed, to generate an application program. The resulting application program can be used by customers, such as distribution firms or businesses, to carry out warehouse control functions and other tasks in the product distribution domain. In the following description, "framework" will refer to the framework illustrated in the drawing figures and "application" will refer to an application program that comprises an implementation of the extended framework, produced by an application developer who uses the framework.

In the FIG. 1 flow diagram, the first step is to incorporate the core framework with the Account Management framework of the invention, as represented by the flow diagram box numbered 104. This step includes the incorporation of any object classes necessary for the system on which the application will run. For example, the preferred embodiment achieves operating platform independence and application program inter-operability by extending classes from the core framework (CF) set of base business classes. In this first step, the application developer will incorporate object classes necessary for achieving operating system independence and program inter-operability by extending and subclassing from the CF classes. In this way, the account management application program can interface with multiple operating systems because only the CF extensions need change to accommodate new operating systems, while the account management application can remain the same. In a similar way, companion application programs can more easily interface with the extended application program because the core, common set of CF classes will be known and will form a common interface.

The next step of application program development is to add desired extensions to the account management framework, including the user interface. To implement this part of the program development process, the application developer-framework user must decide upon the particular extensions needed for the desired account management operations and user interface, including any modifications or extensions to the class attributes and behaviors. The framework extensions are performed by a framework user in a manner dependent on the particular computer system on which the framework is received and manipulated. Such processing is represented in FIG. 1 by the flow diagram box numbered 106.

After the framework extensions are decided upon, the next step is to generate the application program. This step is represented by the flow diagram box numbered 108. The generation of an application program is generally referred to as program compilation. This step also will depend on the particular computer system on which the framework is used. Changes to the compiled program might be desired, both as part of the initial program debug and as part of revisions due to comments received from actual use. The process of determining such desired changes is represented by the flow diagram box numbered 110. When such changes are determined, they must be implemented into the program structure in the form of modified classes, attributes, and methods, which comprise further extensions to the framework. This is represented by the flow diagram path from the "determine changes" step at box 110 back to the "add desired extensions" step at box 106.

Thus, the design of the framework provides a base class on which application program developers can build to add specific features they deem important. The application is easily modified without need for development of new code and operation with applications using the same framework is ensured. Thus, changes to the application are easily accommodated as simply further extensions.

2. Operational Structure

Figure 2:
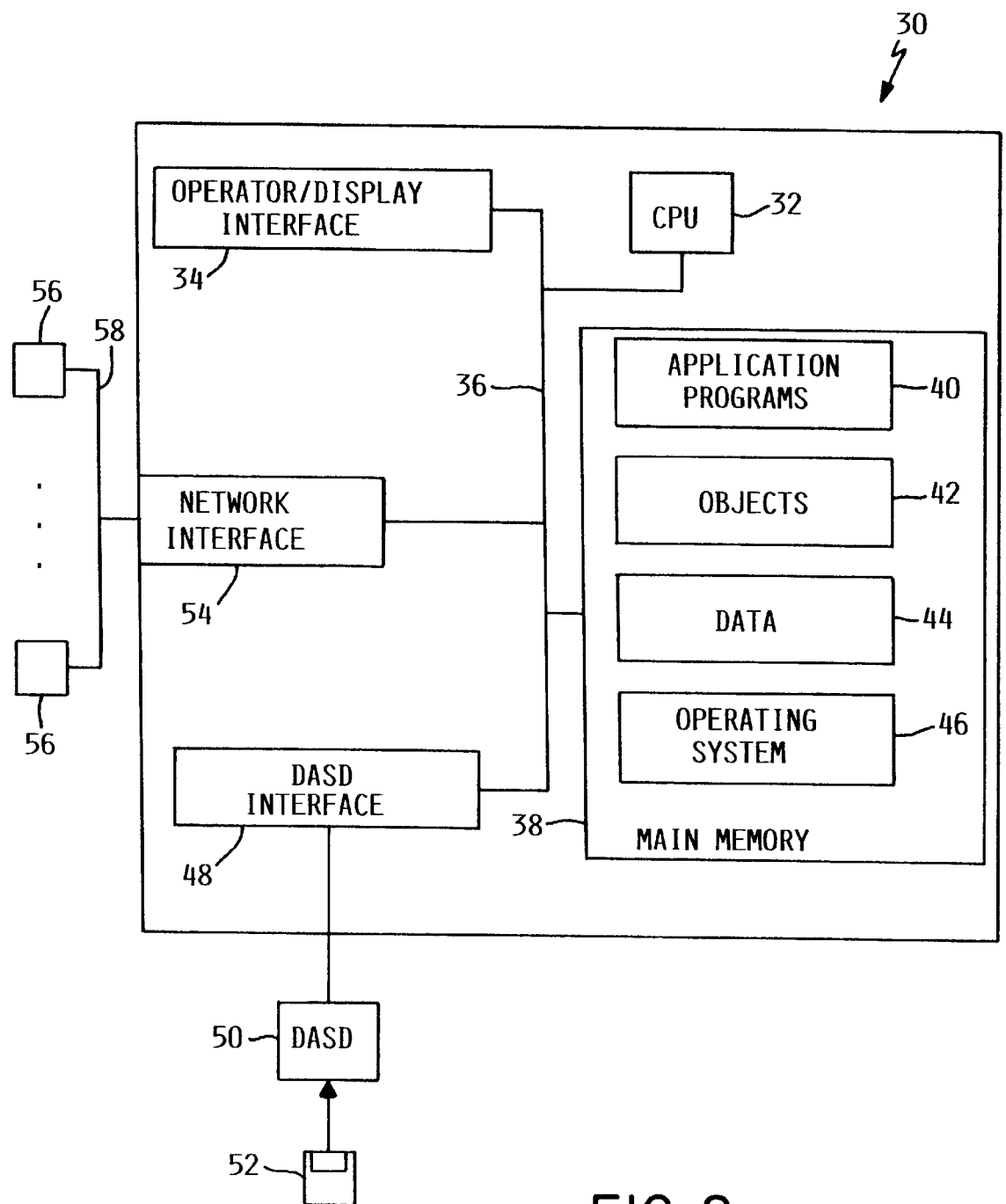
FIG. 2 is a block diagram of a computer system constructed in accordance with the invention.

FIG. 2 is a block diagram of a computer system 30 constructed in accordance with the present invention. The computer system is suitable for utilizing the framework of the invention to develop an application program, and for using the extended framework application program. The computer system 30 includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

3. System Modules

The object oriented framework of the preferred embodiment includes object class categories comprised of an LE Application category of classes that models the relationship between a Ledger class, which holds company structure information for accounts payable and accounts receivable, and other classes that are created or owned by the Ledger class. The framework also includes: an LE Account category that supports a variety of user-defined account types, an LE Business Partner category that permits definition of customers or suppliers with a special relationship to the company; an LE Debt Management Item category that contains details of business transactions with one of the Business Partners; an LE Log category that temporarily stores debt management items; an LE Batches category that permits ledger inputs to be grouped; an LE Audit Log category for maintaining a log of debt management items; an LE Allocation category that manages open items on a business partner; an LE Cash category that models cash to transactions; an LE Payments category to keep track of payments made to business partners; and an LE Collection Documents category that manages the creation and processing of documents exchanged between business partners.

Figure 3:
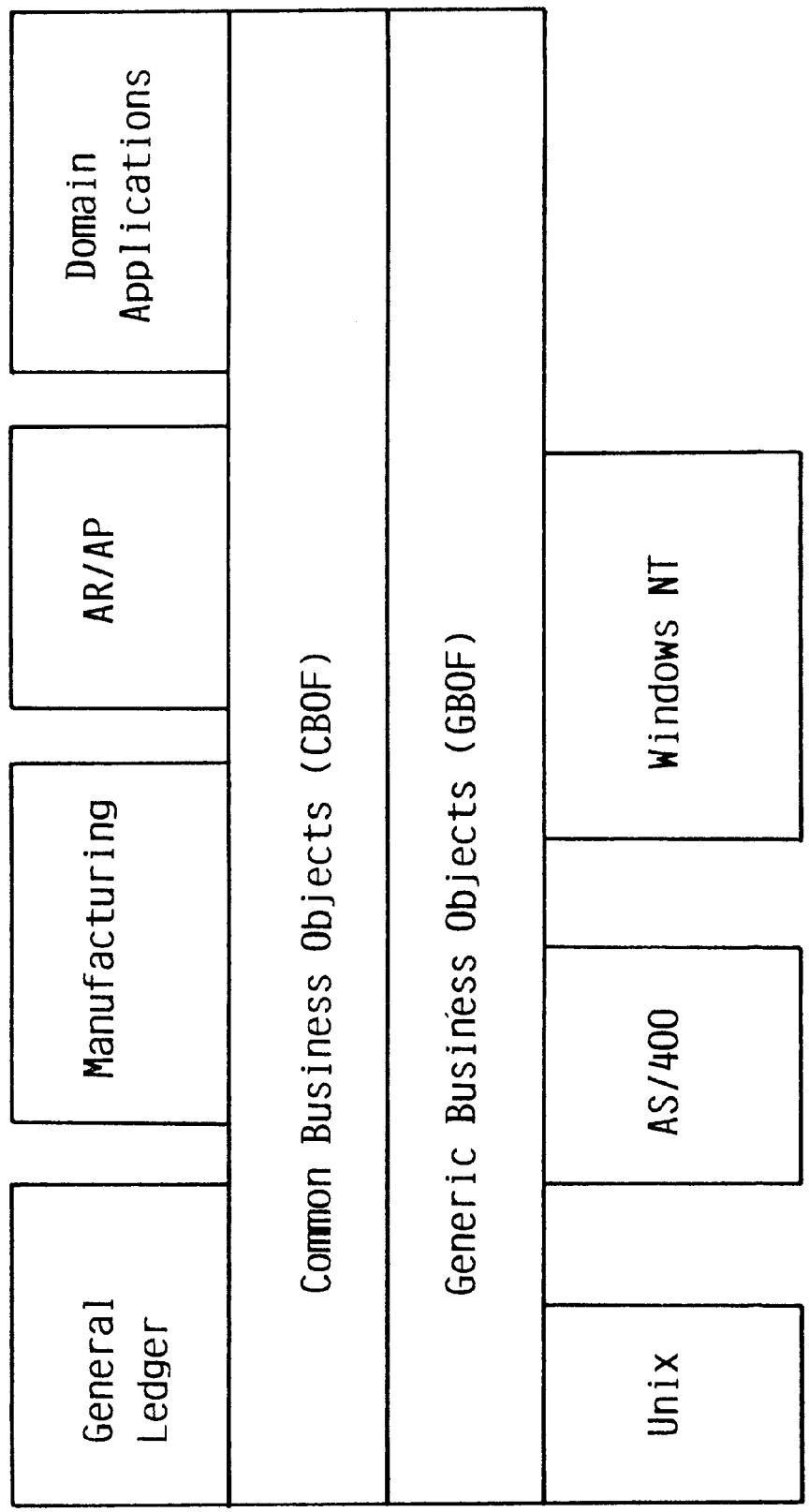
FIG. 3 is a representation of the framework that operates in the system of FIG. 2, showing the Accounts Receivable (AR) and Accounts Payable (AP) mechanisms that together comprise the Ledger (LE) framework, and also showing a related General Ledger (GL) framework and common business objects utilized by the A/R and A/P Ledger framework.

FIG. 3 is a representation of the framework that operates in the system of FIG. 2, showing an Accounts Receivable and Accounts Payable (AR/AP) module, or mechanism, that comprises the AR/AP ledger account management system that is the subject of this description. The AR/AP Ledger mechanism is shown attached to a Common Business Objects framework (CBOF) mechanism and a Generic Business Objects framework (GBOF) mechanism, which together comprise a base or core framework (CF) utilized by the framework of this invention. The CF provides common functionality to permit communication between application mechanisms (such as AR/AP) and different operating platforms, which are indicated in FIG. 3 by the modules indicated as "Unix", "AS/400", and "Windows NT" attached to CF.

Application developers will add subclassing to the classes of which CBOF and GBOF are comprised. The classes of CBOF, for example, will include company identification classes that can serve as base classes for defining companies to multiple application programs. A CBOF "Company" class might contain general identifying company information, while the account management framework of the invention might extend from the CBOF and include "Company"

classes that identify financial accounting parameters of the Company. Another application program, such as a manufacturing application, might include company classes that identify finished products of the Company. The GBOF classes are more directly related to the operating system and computer system side of the operating environment. That is, the GBOF classes are responsible for object persistence according to the operating system and object environment being supported, so that a Ledger object that wants to maintain an object in persistent data storage must interface with GBOF classes. All application programs in related "business object" subject areas, or domains, should be able to make use of the common object classes specified by the CBOF and GBOF classes.

Thus, in FIG. 3 a mechanism called General Ledger is shown attached to the CF (CBOF/GBOF) combination with a Manufacturing mechanism (application) and a module identified as "Domain Applications". All of these mechanisms are shown attached to the CF to indicate that other modules may be developed to communicate with the Account Management framework. In this way, other domain applications may communicate with the Account Management application and similarly interface with different operating platforms. It should be understood that the application mechanisms shown interfacing with the CF and interfacing with the alternative operating systems are exemplary only. That is, it is contemplated that additional domain applications may interface with the Account Management mechanism, and it is contemplated that additional operating platforms may interface with the Account Management.

The CF interface, however, does not form a part of the invention described herein. As noted above, those skilled in the art should be able to produce, without further explanation, a framework that provide the common functionality between operating systems and application domains that are provided by CF.

The AR/AP Ledger mechanism of the account management framework functions in a computer system that includes bank transaction categories, accounting categories, and business model categories. After a framework adopter has extended the framework so as to produce an account management application, the end user of the application provides data and commands to the application through the business model categories, provides accounting input through the accounting categories, and receives account reporting information through the account management categories.

4. Category Diagram

Figure 4:
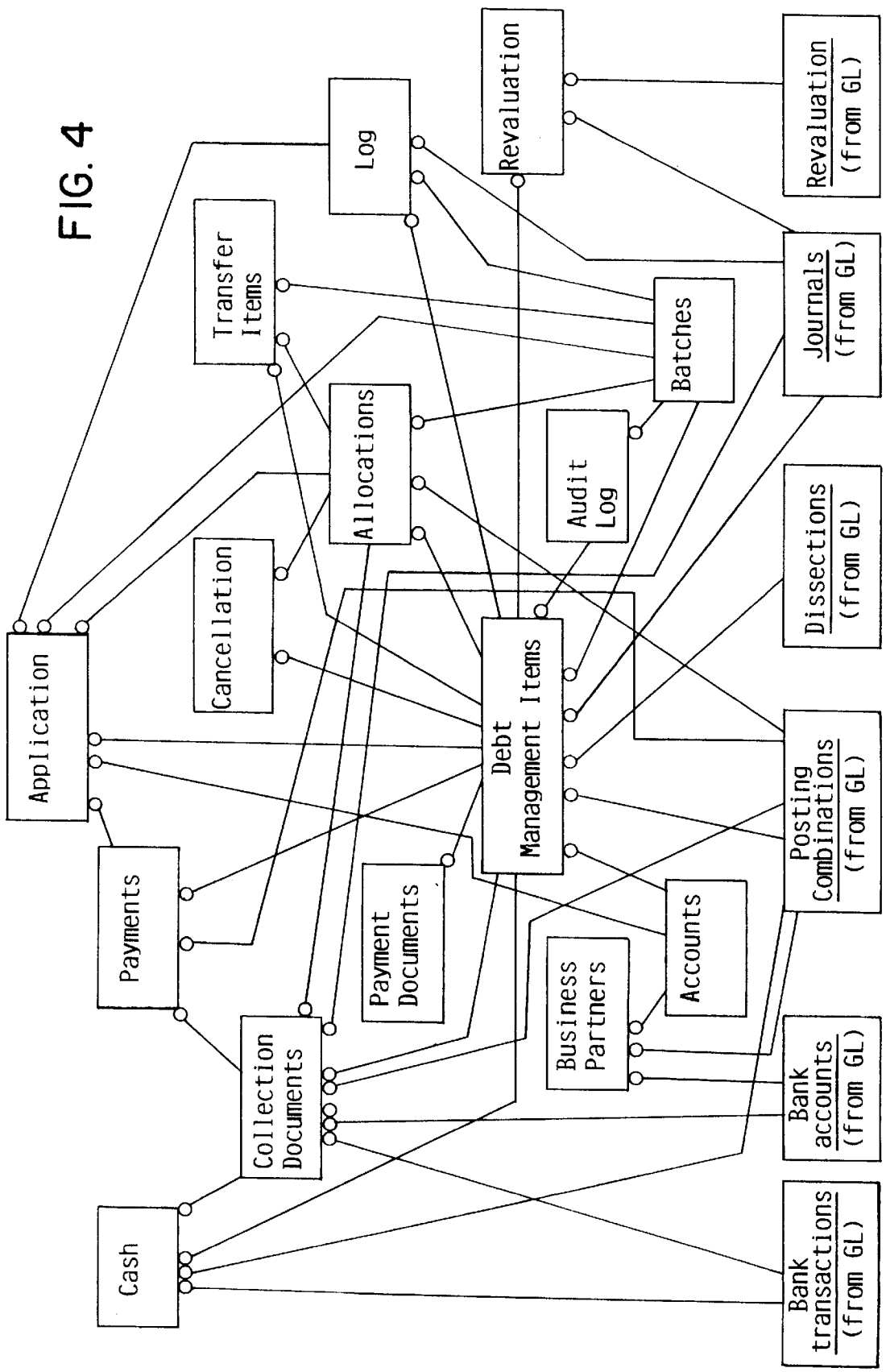
FIG. 4 is a category diagram representation of the General Ledger framework illustrated in FIG. 3.

FIG. 4 is a category diagram for the AR/AP Ledger mechanism of the framework implemented in the computer system of FIG. 2. Those skilled in the art will appreciate that the categories illustrated in FIG. 4 contain groups of OOP classes that encapsulate data attributes and behaviors, and are stored in the memory of the computer system. Such classes can be implemented, for example, in a computer system operating environment that supports the C++ programming language. It should be understood that a category as used in this description refers to describing the classes that make up the framework in terms of categories for purposes of easier explanation. The categories do not necessarily represent a structure that is reflected in any programming implementation of the framework.

The framework categories provide a base of information that can be used by program developers and from which extensions can be developed. That is, the inventors of the present framework have identified a set of OOP classes most likely to be desired by developers of AR/AP Ledger account management application programs and have defined the relationships between such classes. Those skilled in the art will recognize that such classes can be overridden by users of the framework in that framework users who are developing applications can incorporate extensions and additions that suit the purposes of the user.

The categories of the AR/AP Ledger framework will be referred to with a preceding "LE", unless not required by the context in which the category is being described.

FIG. 4 shows that an LE category called Application references several other categories of the framework, including Payments, Accounts, Debt Management Items, Allocations, Batches, and Log. The LE Application category models the relationship between ledgers and the other elements of a company's financial condition so as to represent the interface through which the application program user provides data and receives reports. The LE Accounts category referenced by the LE Application supports a variety of user-defined account types, the LE Payments category keeps track of payments made to business partners, who are customers or suppliers with special relationships to the company, the LE Debt Management Item category contains details of business transactions with one of the LE Business Partners, the LE Allocations category manages open items on a Business Partner, the LE Log category temporarily stores Debt Management Items, and the LE Batches category permits ledger inputs to be grouped.

Additional categories illustrated in FIG. 4 include an LE Cash category that models cash to transactions, an LE Collection Documents category that manages the creation and processing of documents exchanged between business partners, an LE Payment Document category that formats payment documents, the LE Business Partner category defined above, an LE Cancellation category for canceling items, an LE Transfer of Items category, which transfers items from one business partner to another, LE Revaluation, which converts current prime balances to a base currency and resolves variance to current base, and an LE Audit Log category, which makes a record of changes made to the ledger.

The categories illustrated at the bottom of FIG. 4 are for purposes of illustration and comprise categories containing information about the general ledger details of the company. In the preferred embodiment, such general ledger details are obtained from a General Ledger framework (GL) having a construction that is described in a co-pending application called "Object Oriented Technology Framework For General Ledger" by the inventors herein, assigned to International Business Machines Corporation. Categories that represent groups of classes from the General Ledger framework are referred to with a "GL" preceding their respective names. The categories that conveniently interface with the present invention comprise GL Bank Transactions; GL Bank Accounts; GL Posting Combinations; GL Dissections; GL Journals; and GL Revaluation. It should be understood that these categories are exemplary and are for purposes of illustration only; other categories will occur to those skilled in the art. Persons skilled in the art who utilize this framework are free to decide upon a different mix of categories, so long as the common functionality described herein is provided.

5. Class Diagrams

There is no uniform standard for OO programming, but this description will use the widely followed convention that class names comprise descriptive words whose initial letters are upper case.

a. LE Application.

Figure 5:
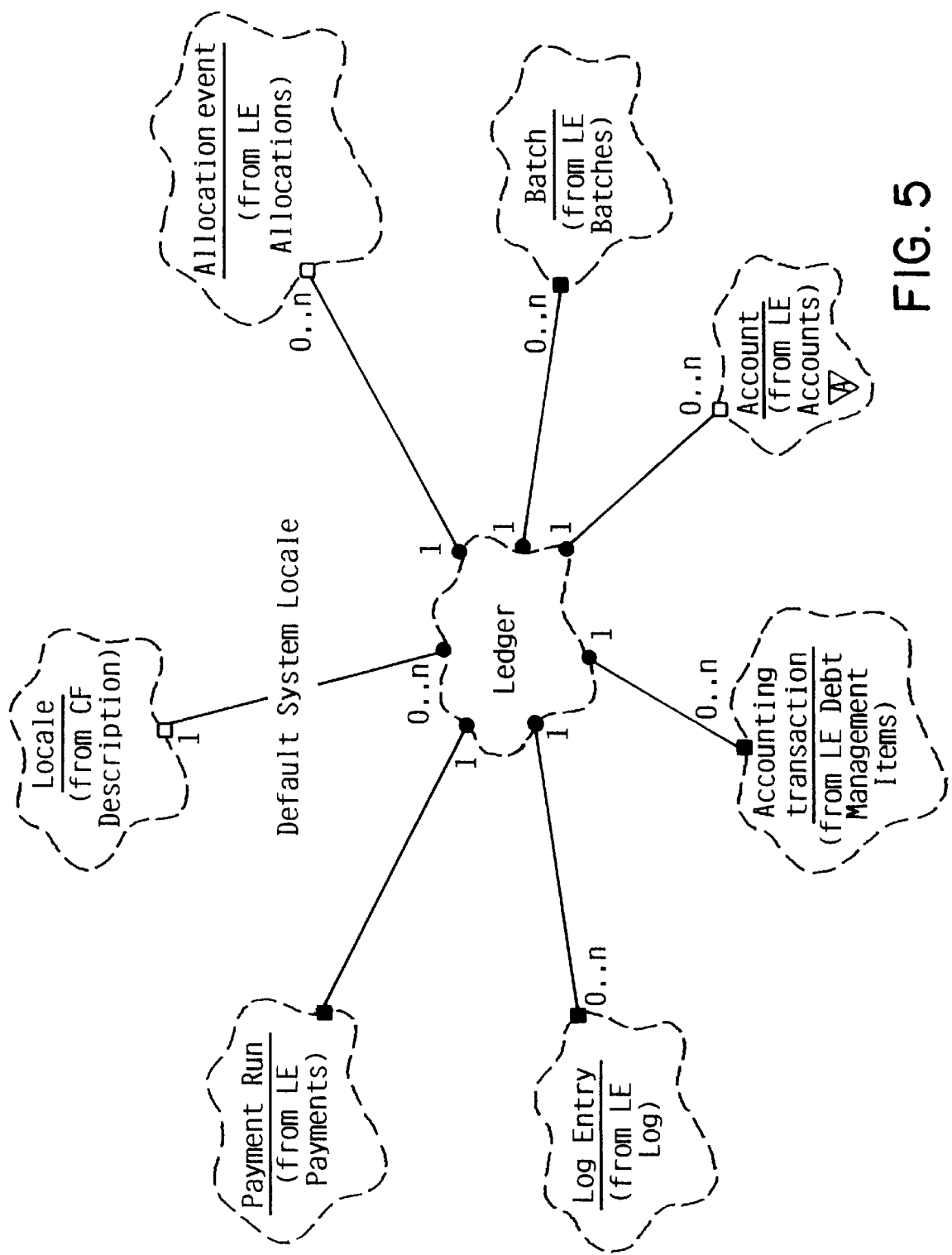
FIG. 5 is a class diagram of the LE Application category illustrated in FIG. 4, showing the Ledger class and related classes.

The framework models a company's ledger with a Ledger class of objects, as illustrated in FIG. 5. The Ledger class holds company structure information pertaining to accounts payable and accounts receivable. FIG. 5 is a class diagram that illustrates the characteristics of the class called Ledger, which is said to be "from" the Application category, meaning that the Ledger class of objects is conceptualized in the framework description as part of a larger Application group or category of related classes. FIG. 5 shows that the Ledger class references other classes called Locale, Allocation Event, Batch, Account, Accounting Transaction, Log Entry, and Payment Run.

The Locale class is used to identify a default system geographic location. This is done for purposes of determining report language and numeric format defaults and conventions. The Allocation Event class keeps track of a group of items that have been allocated together at the same time and the Batch class provides an optional capability to group items that are to be entered into the ledger together, as a batch. The Account class provides an abstract structure for maintaining any account. That is, this provides an extension point to permit accounts other than business partner accounts to be operated as open item accounts. The Accounting Transaction class associates a Debt Management Transaction class, which is a business transaction with a business partner, to one or more general ledger control account movements, the Log Entry class to permit items received for entry into the A/R or A/P ledger to be held on a log pending authorization or confirmation, and the Payment Run class groups together payments that are made to business partners for ease of processing in automatic runs.

b. LE Account.

Figure 6:
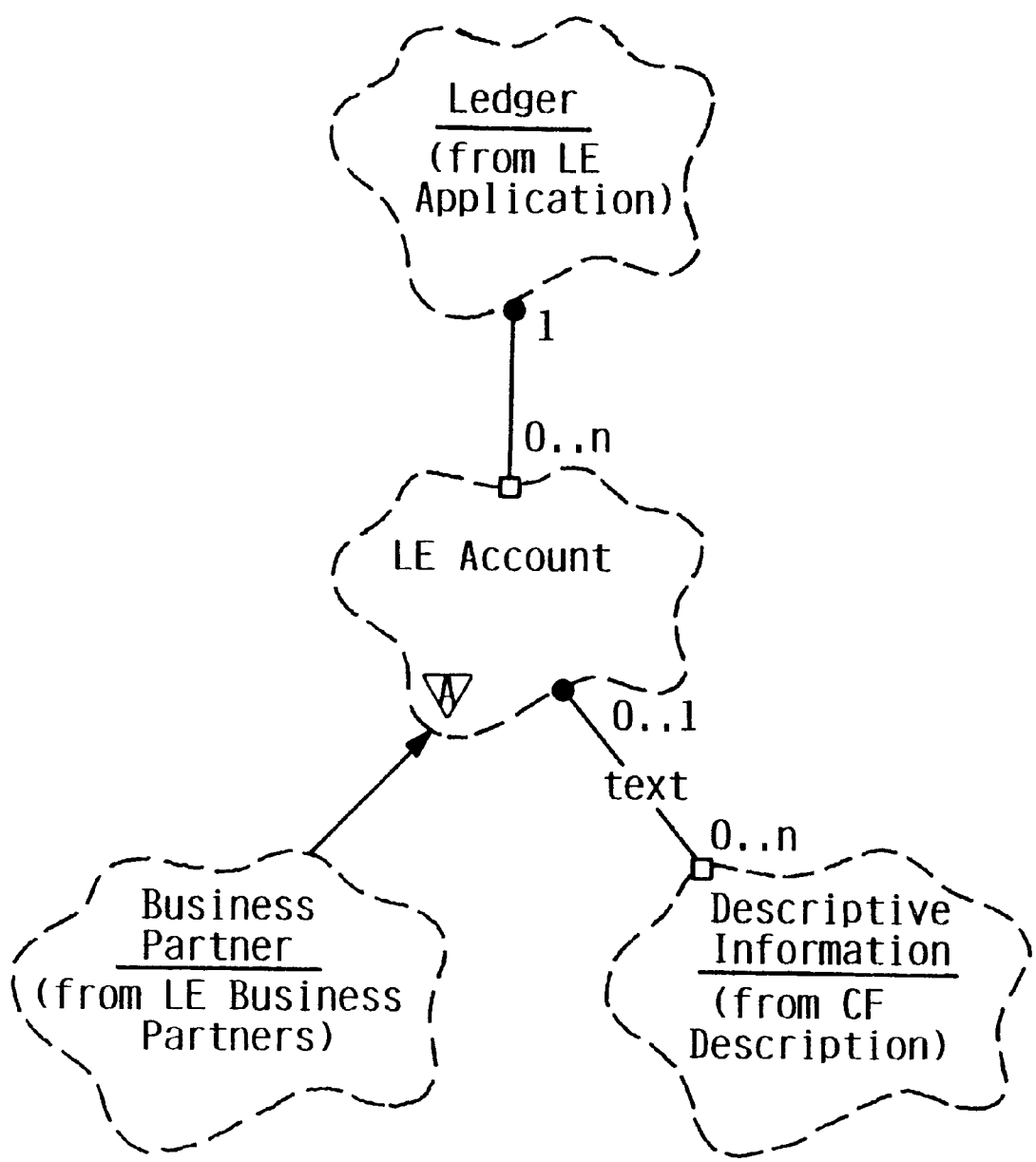
FIG. 6 is a class diagram of the LE Account category illustrated in FIG. 4, showing the Account class and related classes.

FIG. 6 is a class diagram that illustrates the characteristics of the LE Account category, which permits operation of account types other than business partners as open item accounts in the ledger. This feature can be used, for example, for accounts in the general ledger that need to be run as open item accounts. FIG. 6 shows that the classes in the category include a Business Partner class that inherits the account structure from the Account class. The Business Partner class contains the attributes of a business partner that are unique to the A/R or A/P ledger, such as item balances or legal status. If the account is not a business partner account, then the subject business partner could, for example, identify an employee who is due for some form of non-payroll payment by the company. The LE Account category also includes a Description class that associates descriptive information with an Account class member in the language indicated by the Locale object associated with the Ledger.

c. LE Business Partner.

Figure 7A:
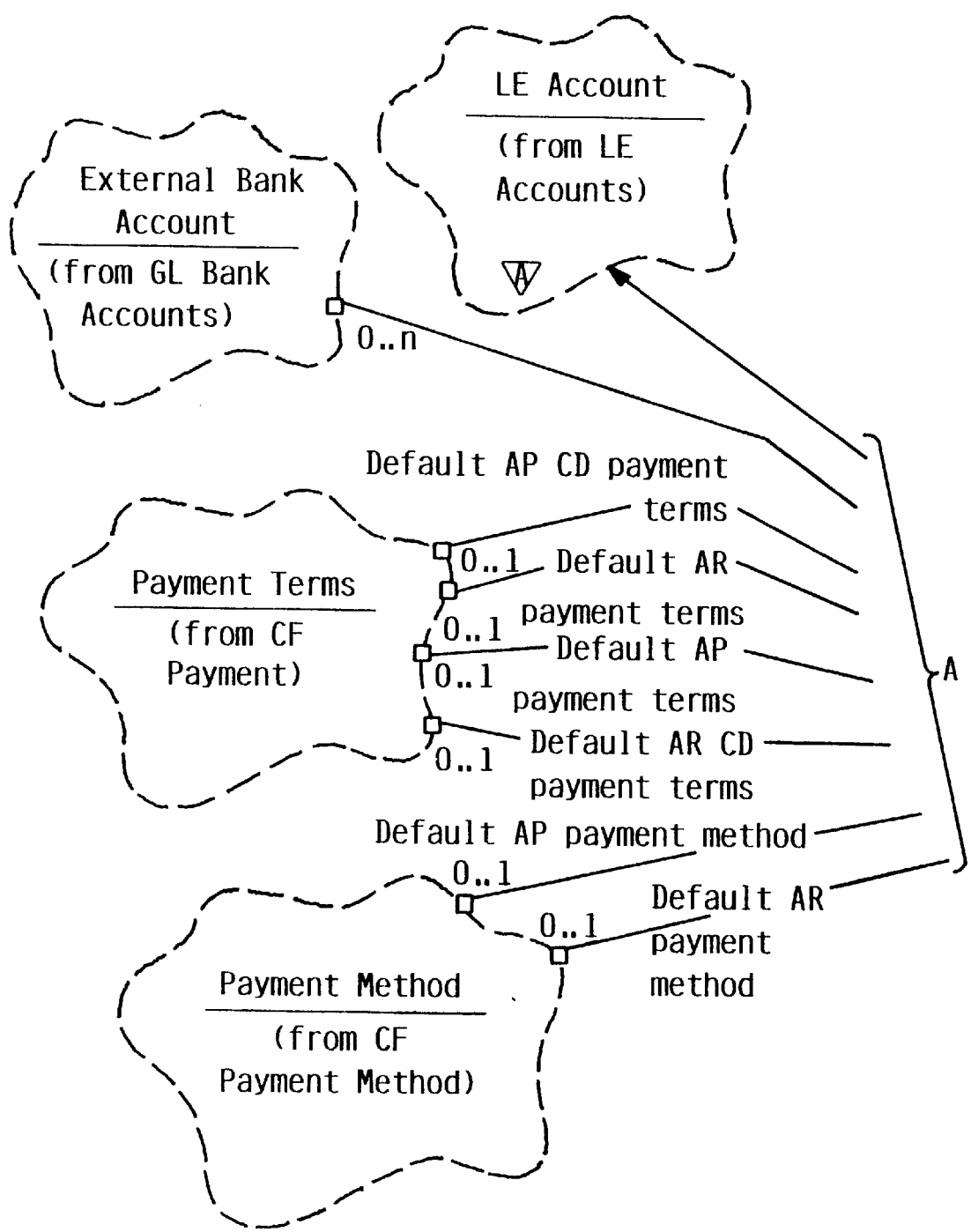
FIG. 7 is a class diagram of the LE Business Partner category illustrated in FIG. 4, showing the Business Partner class and related classes.
Figure 7B:
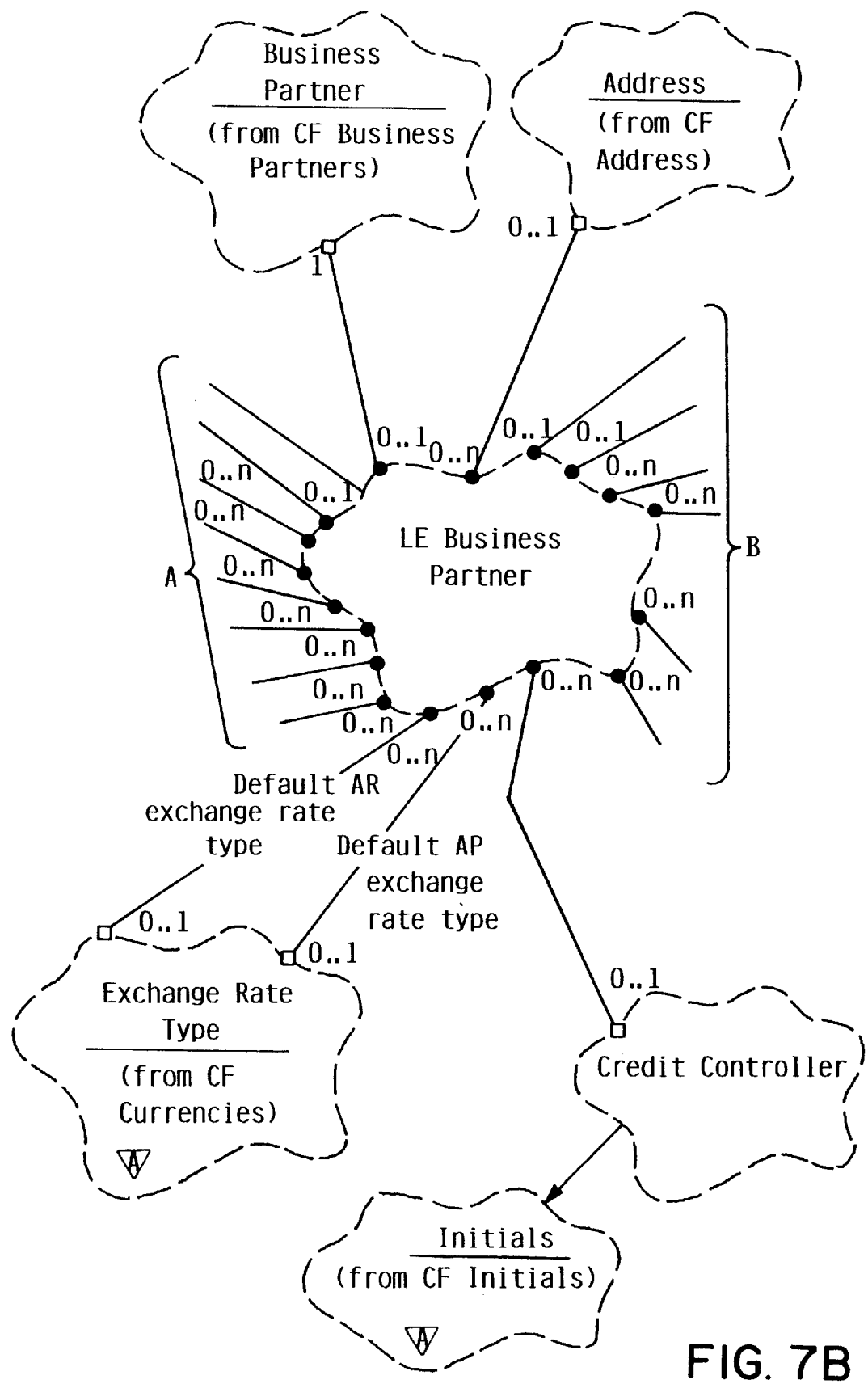
Figure 7C:
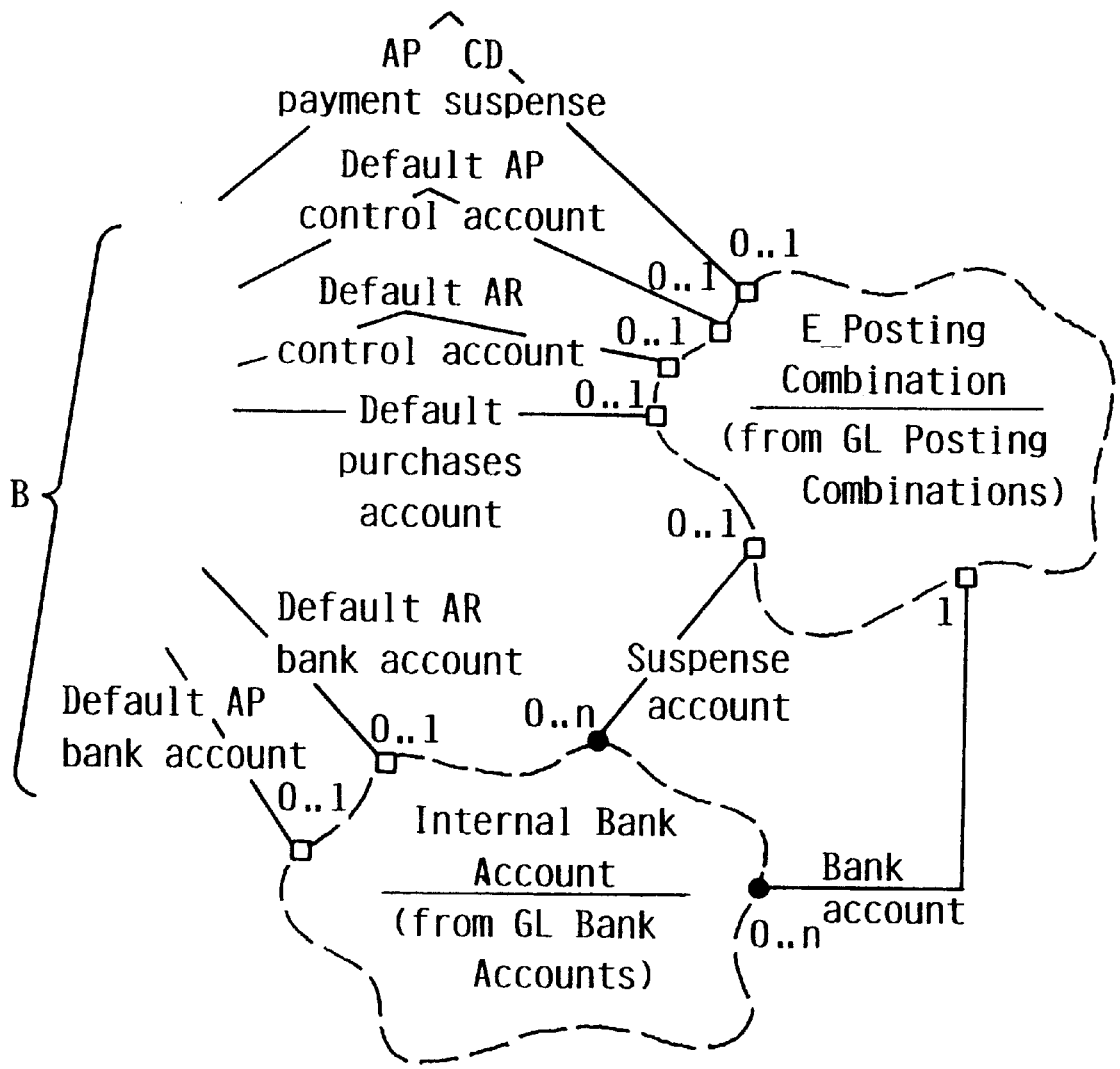

FIG. 7 is a class diagram that illustrates the characteristics of the LE Business Partner class category, which provides the structure and behavior associated with a customer or supplier that is unique to Accounts Payable and/or Accounts Receivable. This includes such things as payment terms, bank account information, statement address, posting combinations, and the like. FIG. 7 shows that this category includes a Business Partner class that references classes called Account, Business Partner, Address, Posting Combination, Internal Bank Account, Credit Controller, Exchange Rate Type, Payment Method, Payment Terms, and External Bank Account. These classes are used to define business partners and their relationship to the company.

The Account class inherits the structure and behavior of Accounts Receivable and Accounts Payable accounts for managing the accounts associated with the subject Business Partner. The Address class contains the addresses to send statements or payments for Business Partners. The Posting Combinations class comprises an extendible class that permits the framework user to identify default general ledger accounts to be used for various activities related to the Business Partner. Such accounts include an accounts payable CD Payment Suspense used when balances are being paid via collection documents that have not yet cleared, control accounts, and purchase accounts. The Internal Bank Account class comprises both a default accounts receivable bank account and a default accounts payable account. These are the accounts into which A/R deposits are credited or from which A/P withdrawals are made, respectively. Objects of the Internal Bank Accounts reference posting combinations to identify the general ledger account numbers for bank accounts and/or the suspense account associated with a bank account.

The Credit Controller class identifies a person who is responsible for managing the Company credit line and the balance associated with the Business Partner. The Exchange Rate Type class identifies a default exchange rate for monetary currencies to be used for payments to or from the Business Partner. The Payment Method class identifies the default payment method, such as check, collection document, or the like, to be used for payments to and from the Business Partner. The Payment Terms class identifies the default payment terms associated with collection documents and payments to or from the Business Partner. Finally, the External Bank Account class is the bank account of the Business Partner to whom or from whom payments are made.

d. LE Debt Management Items.

Figure 8A:
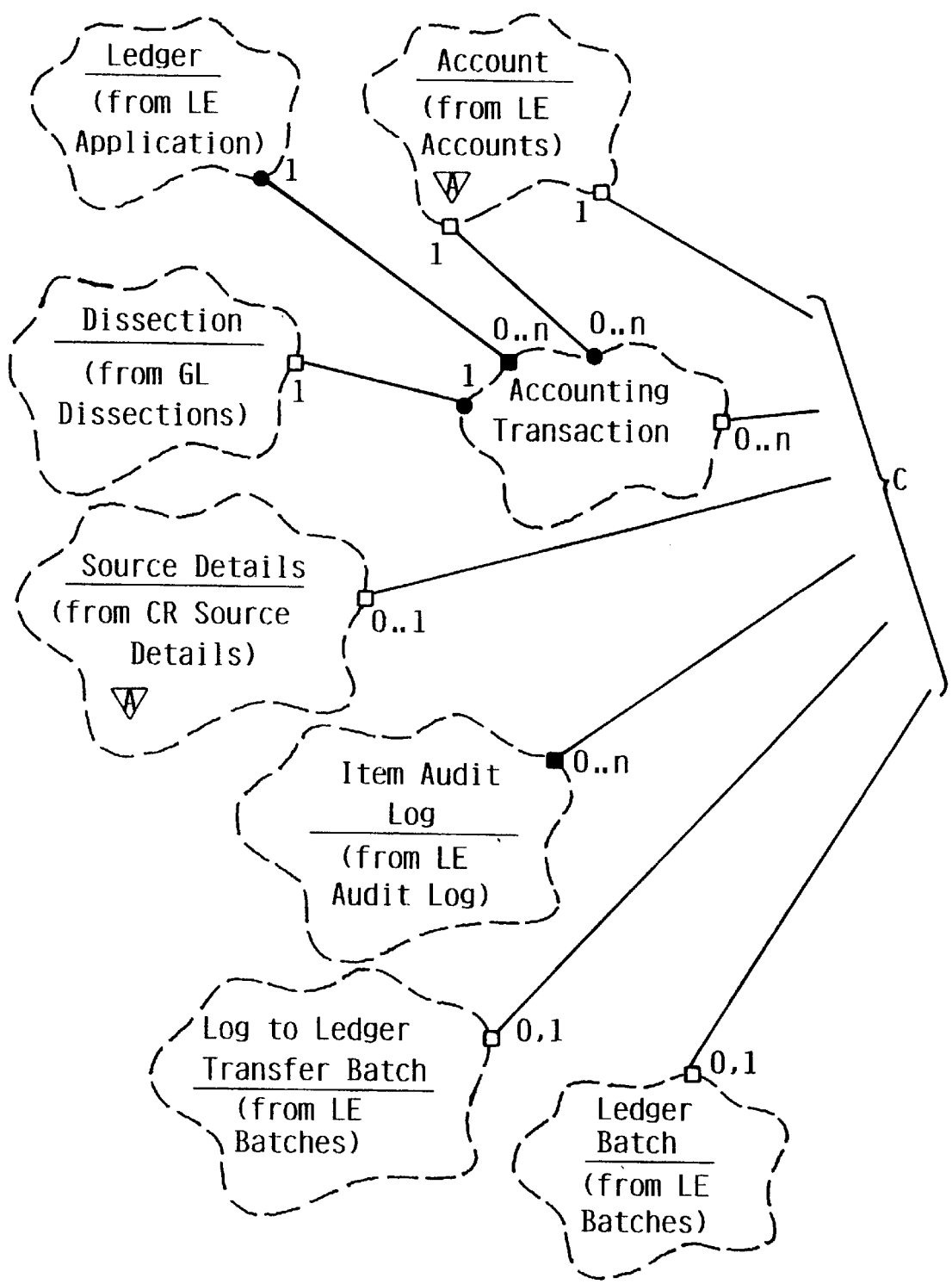
FIG. 8 is a class diagram of the LE Debt Management Items category illustrated in FIG. 4, showing the Debt Management class and related classes.
Figure 8B:
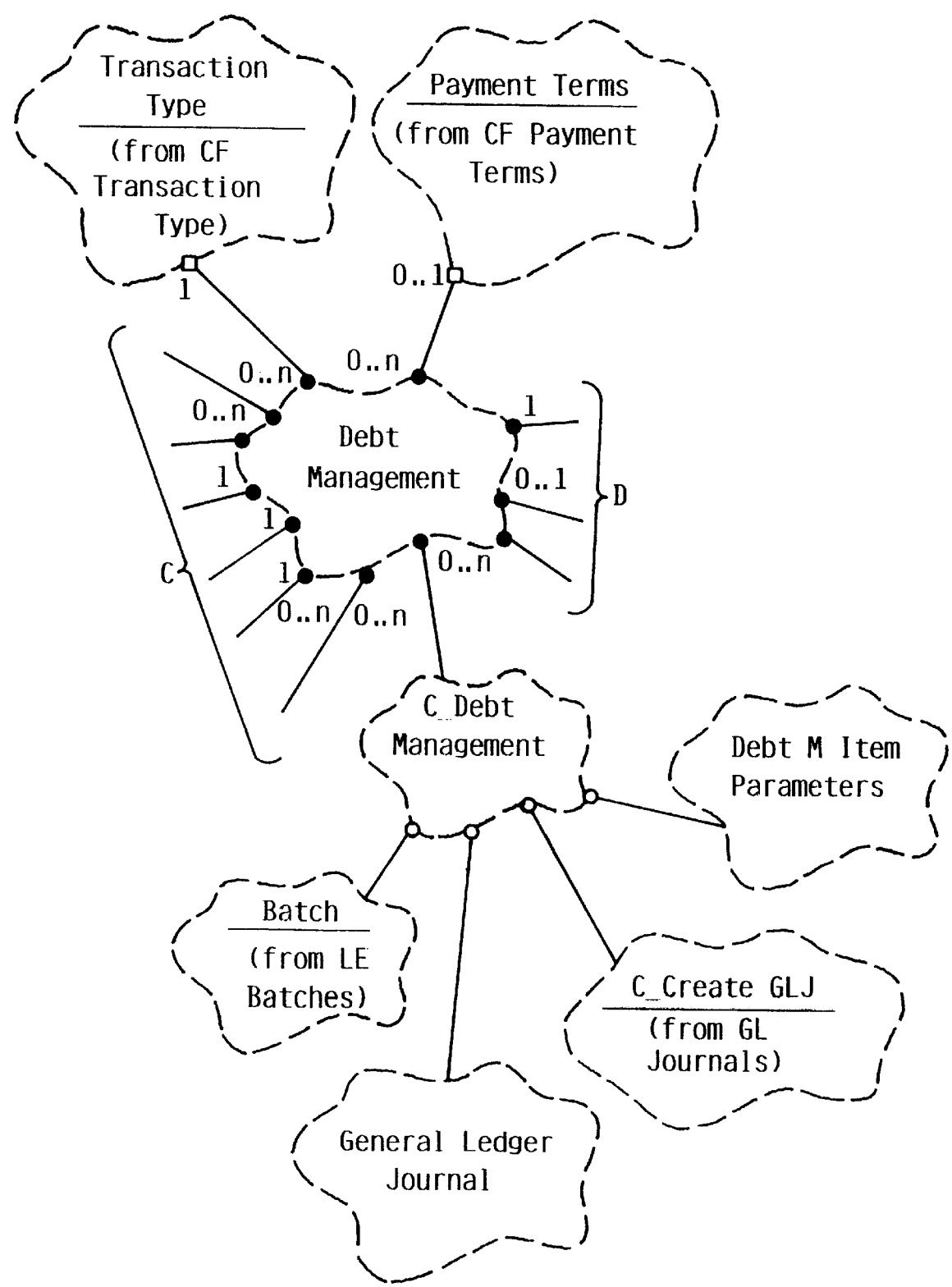
Figure 8C:
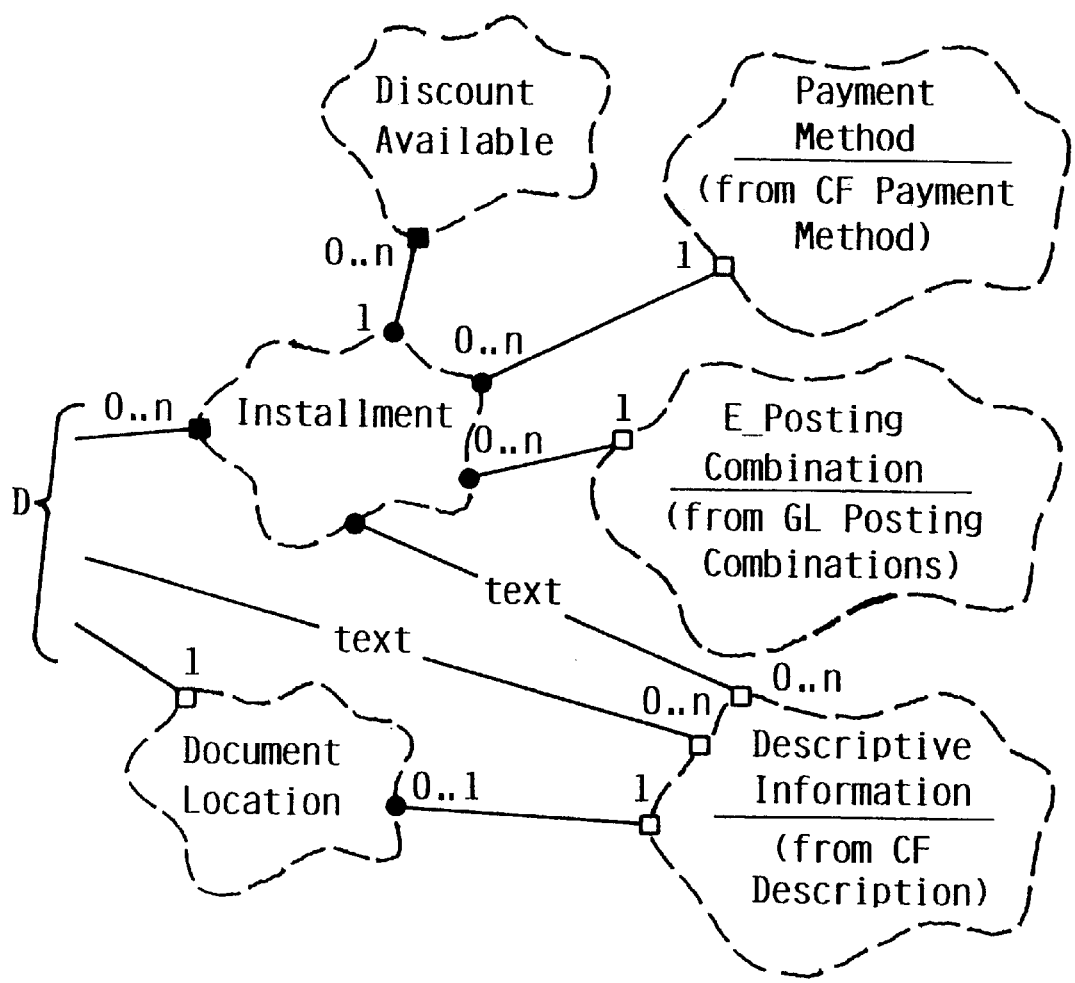

FIG. 8 is a class diagram that illustrates the characteristics of the LE Debt Management Items category, which is responsible for managing details of a business transaction with a business partner, such as how and when payment is to be collected or made, and which can generate installments or accept them as input. This category includes a Debt Management class (shown in FIG. 8), which can comprise an invoice sent or received, a credit note, or the like. An object of the Debt Management class references a Transaction Type that describes which type of item the Debt Management object is. A Debt Management object can be entered directly to the Ledger or can reside in a log until it is confirmed.

As shown in FIG. 8, the objects of the Debt Management class reference many other classes. The referenced classes include Account, Payment Terms, Installments, Description, Ledger Batch, Log to Ledger Transfer Batch, Item Audit Log, Source Details, and Accounting Transaction. The Account class is referenced by each Debt Management class member for information about the business partner account it is associated with. The Payment Terms class is referenced because there may optionally be payment terms that override the default for the business partner. The Installments class is referenced by the Debt Management class members because each of them will always have one installment, unless the member is still on a log and installments have not yet been generated.

The Installment class in turn references Discounts that are available for the Installment, the Payment Method for the Installment, a Posting Combination to identify the general ledger control account that currently applies for the Installment, and an optional Description class for the Installment.

The Debt Management class also references a Description class for itself and a Ledger Batch that optionally groups together a set of Debt Management members to be processed together for posting directly to the A/R or A/P ledgers. The Log to Ledger Transfer Batch is referenced by the Debt Management class for optionally grouping together a set of Debt Management members being transferred from the log to the ledger. The Item Audit Log is created when a Debt Management class member is changed to provide an audit log for changes, the Source Details class contains information about the source of the Debt Management member, and the Accounting Transaction class links the Debt Management class member to one or more general ledger control account dissections, which references the business partner account with which it is associated.

e. LE Log.

Figure 9:
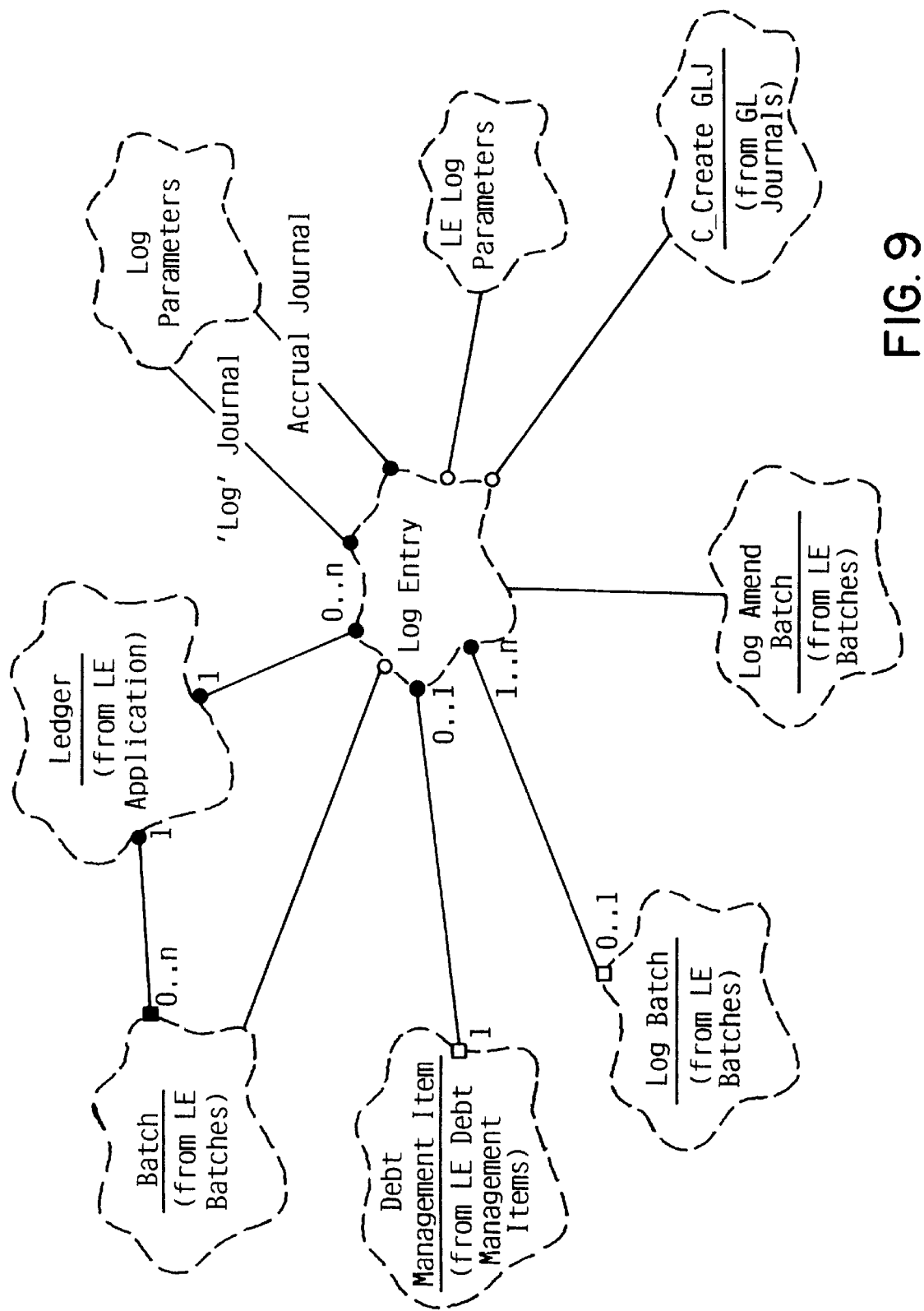
FIG. 9 is a class diagram of the LE Log category illustrated in FIG. 4, showing the Log Entry class and related classes.

FIG. 9 is a class diagram that illustrates the characteristics of the LE Log category. FIG. 9 shows that this category includes a Log Entry class. Members of the Log Entry class are AR or AP debt management items that have been entered into the account management system, but have not yet been authorized or confirmed.

FIG. 9 shows that the Log Entry class references a class called ledger, which is a collection of AR or AP accounts to which the Log Entry relates. The ledger class contains references to the set of log entries that pertain to its accounts. It also references the Batch class, which provides access to the various batch groupings of inputs that affect the ledger, such as the ledger batch and the log batch.

The Log Entry class manages an entry on the log from its creation until the entry becomes a debt management item or is cancelled. The Log Entry class references or uses classes called Create GL Journal Controller, General Ledger Journal, Log Parameters, Batch, Log Batch, Log Amend Batch, and Debt Management Item. The Log Entry class uses the Create GL Journal Controller Class to create general ledger journal postings for the log entry. The Journal class is used to create a memo or record for documenting the fact that there is an entry on the log without creating any impact on account balances. In addition, an option "accrual" journal can be created to reflect the future impact of the log entry in a general ledger accrual account. The Log Parameters class provides the company default values for log entries. The Batch class provides the general set of capabilities necessary to assemble and process groups or batches of inputs that will create new log entries or amend existing log entries. The Log Batch class permits an optional association with a log entry, a specialization of the Batch class that only contains new log entries. The Log Amend Batch class permits association with a log entry to provide a specialization of the Batch class that only contains inputs to change existing log entries. The Debt Management Item class members are created when a log entry is confirmed or authorized. During the remainder of its existence, a log entry will reference the debt management item created.

f. LE Batches.

Figure 10:
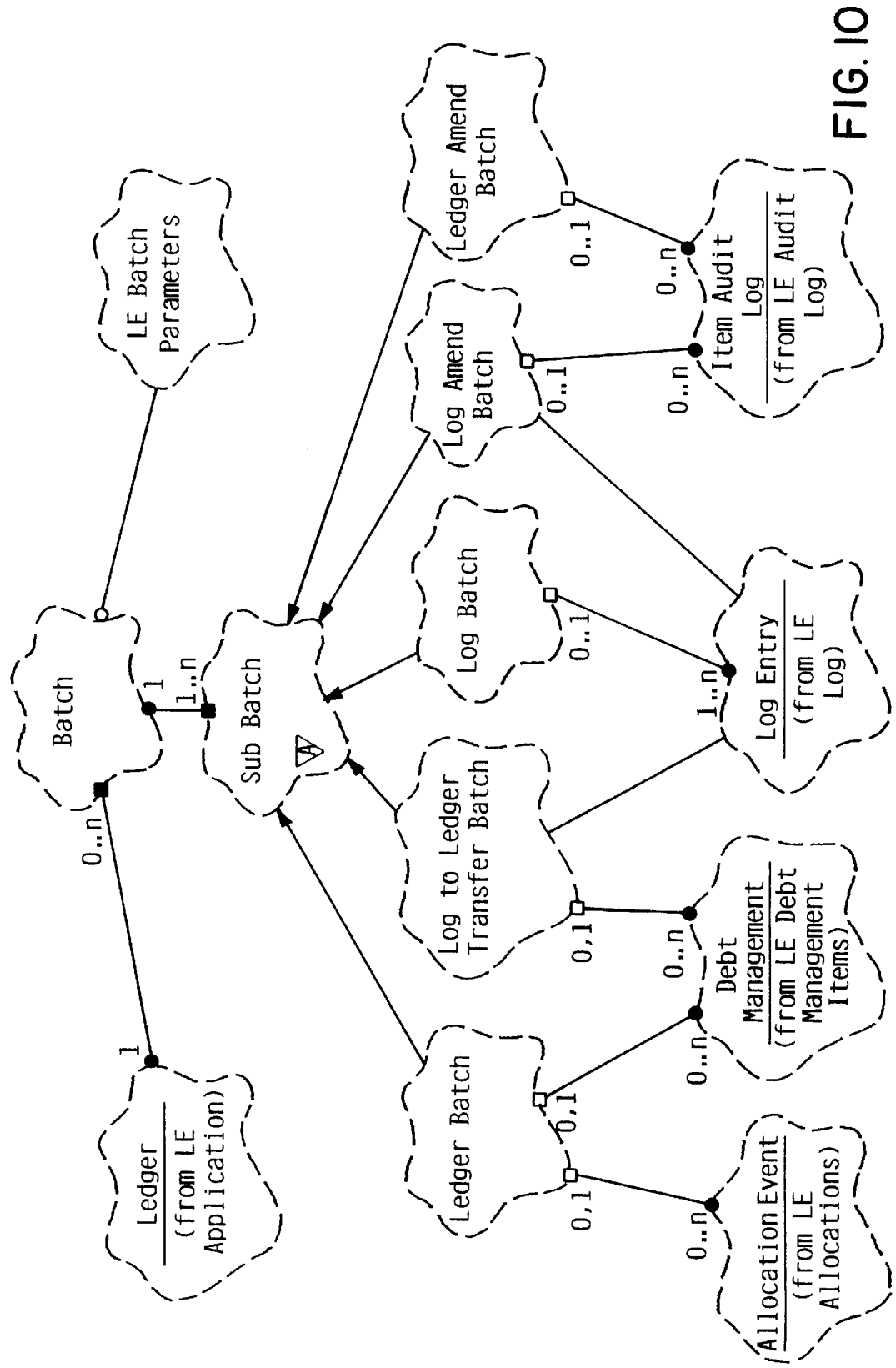
FIG. 10 is a class diagram of the LE Batches category illustrated in FIG. 4, showing the Batch class and related classes.

FIG. 10 is a class diagram that illustrates the characteristics of the LE Batch category, which provides an optional grouping capability for A/R and A/P ledger inputs. This category permits the inputs to be processed as a group including start, suspend, restart and commit capabilities. The category also facilitates inquiry, reporting, and controls by batch grouping. FIG. 10 shows that this category includes a Batch class that references the Ledger class, the Batch Parameters class, and the Sub Batch class.

The Ledger class was described above in connection with FIG. 9, and contains references to the Batch groupings of inputs that relate to it. The Batch class contains data that describes a group of ledger inputs that are to be processed together and provides the capabilities to create, process, and provide information about that group of inputs.

The Batch class references or uses the Batch Parameters class, which contains company level parameters required by the Batch class, such as whether batches are required, whether batch totals should be validated, and whether batch quantities should be validated. The Batch class also references the Sub Batch class, which is an abstract class that provides base capabilities required to group ledger inputs within a batch according to the operation performed by the input. The Sub Batch class is specialized into different types of sub-batches within the framework. For example, a likely extension of the framework might be for an application provider to define the additional types of sub-batches illustrated in FIG. 10. These exemplary types include a Ledger Batch, a Log to Ledger Transfer Batch, a Log Batch, a Log Amend Batch, and a Ledger Amend Batch class.

g. LE Item Audit Log.

Figure 11:
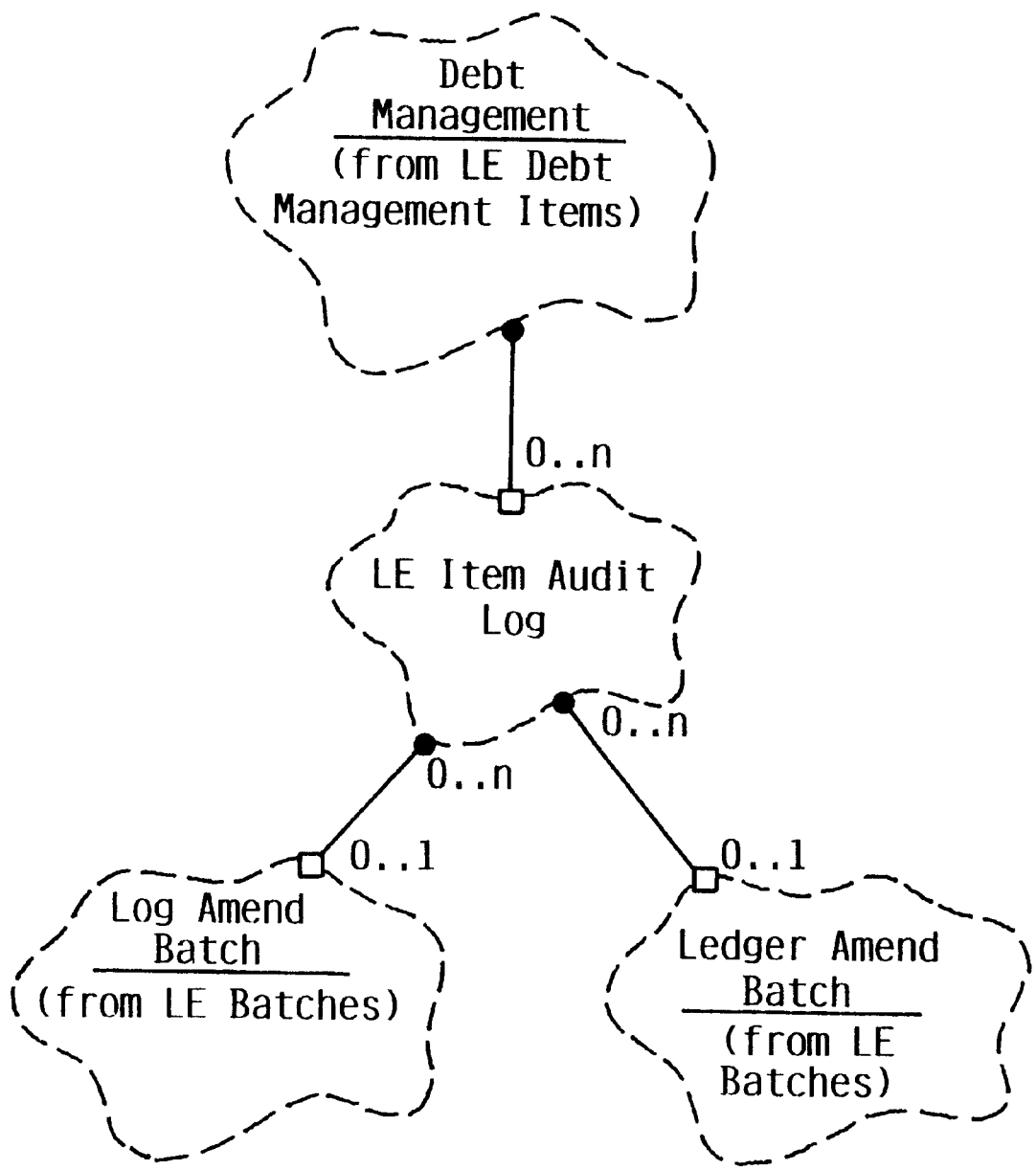
FIG. 11 is a class diagram of the LE Audit Log category illustrated in FIG. 4, showing the Item Audit Log and related classes.

FIG. 11 is a class diagram that illustrates the characteristics of the LE Item Audit Log category, which maintains a record of changes made to a debt management item. FIG. 11 shows that this category includes the debt management item which contains a reference to each of the item audit log instances that have impacted it. The debt management item class references the item audit log class which describes one change to a debt management item on the ledger or describes a log entry. Members of this class in turn reference members of the Log Amend Batch class, the batch in which the change to a log entry was processed and Ledger Amend Batch, the batch in which a change to a ledger entry was processed.

h. LE Allocation.

Figure 12:
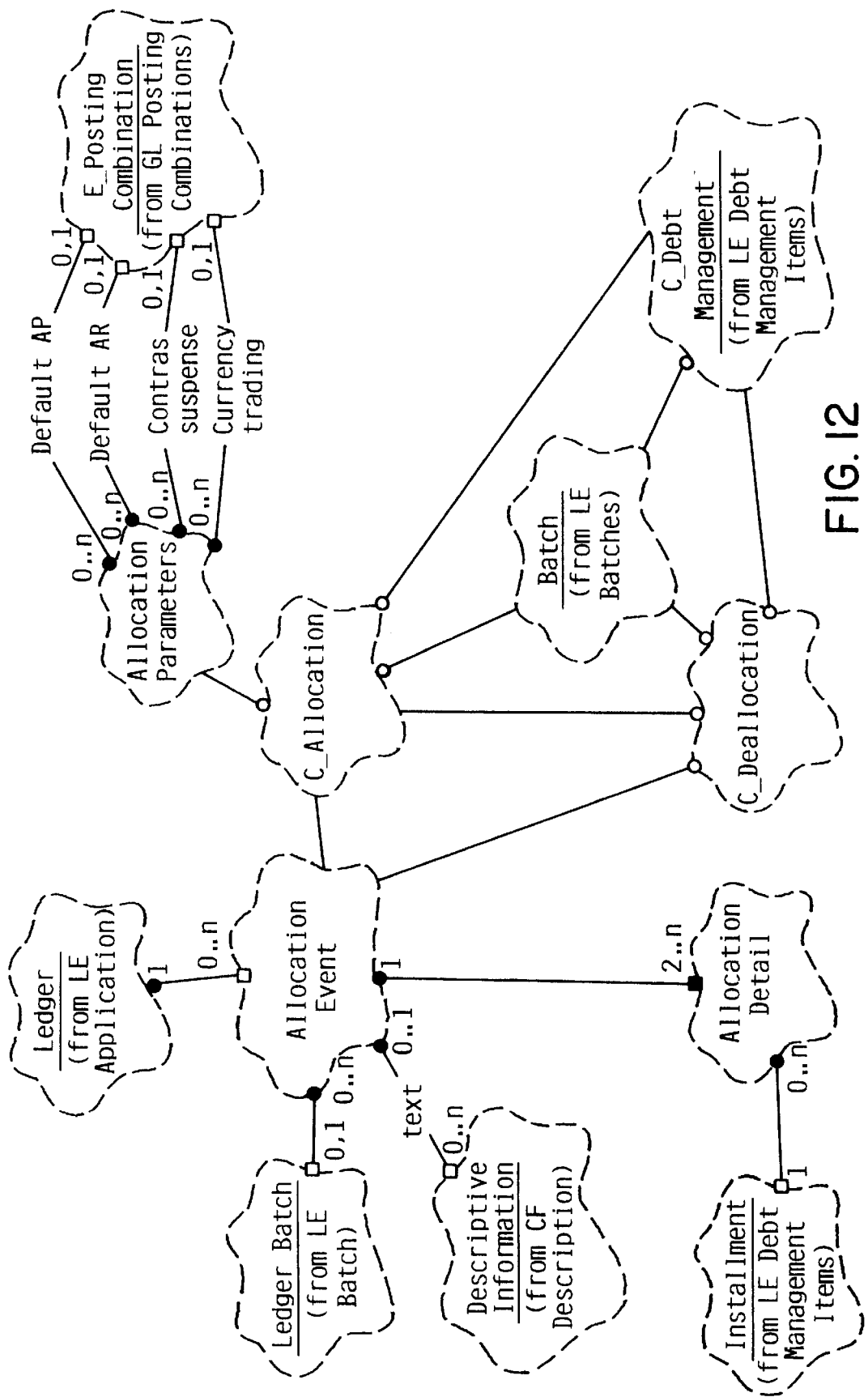
FIG. 12 is a class diagram of the LE Allocations category illustrated in FIG. 4, showing the Allocation class and related classes.

FIG. 12 is a class diagram that illustrates the characteristics of the LE Allocation category, which opens items on a business partner account against each other. For example, this category may allocate a check received from a customer to two outstanding invoices. This category includes allocations within a hierarchy business partner. FIG. 12 shows that this category includes two control classes, an Allocation class and a Deallocation class. The Allocation class controls the allocation process and creates links between items that are being allocated together at the time. The Deallocation class reverses a previous allocation by creating deallocation movements and cancelling items that arose as a result of the previous allocation, such as a currency gain or loss.

The Allocation class references or uses classes called Allocation Parameters, Debt Management Item Control, Batch, Allocation Event. The Allocation Parameters class contains company level parameters required by the Allocation class, such as default posting combinations to be used for recording discounts taken on payments to a business partner, the posting combination to be used for gains and losses due to currency trading. The Debt Management Item class creates any new debt management items that arose as a result of the allocation, such as currency gain or loss. The Batch class provides optional batch grouping and processing for allocation events. Such events can be included in a ledger batch along with new debt management items. The Allocation Event class keeps track of groups of items that have been allocated together at the same time. These class members hold date, accounting, currency, and similar information for the event. The Allocation Event in turn references the Ledger Batch class, which references information about a batch, Descriptive Information, which contains text to describe the allocation event, and Allocation Detail, which holds the details of allocations made. The allocation detail class, for example, might contain the value of allocation in a base currency, or discount taken in a base currency. The allocation will reduce the outstanding balance of the item. For example, a payment allocated against an installment will reduce the outstanding balance of the installment. If the allocation is applied against an installable item, it will reference the installment that is affected.

The Deallocation class references the Debt Management class to cancel any new debt management items that arose as a result of the allocation, and references the Batch class, to provide optional batch groupings and processing for deallocation events. The Deallocation class also references the Allocation class and the Allocation Event class to cancel a previously entered allocation event.

i. LE Cash.

Figure 13:
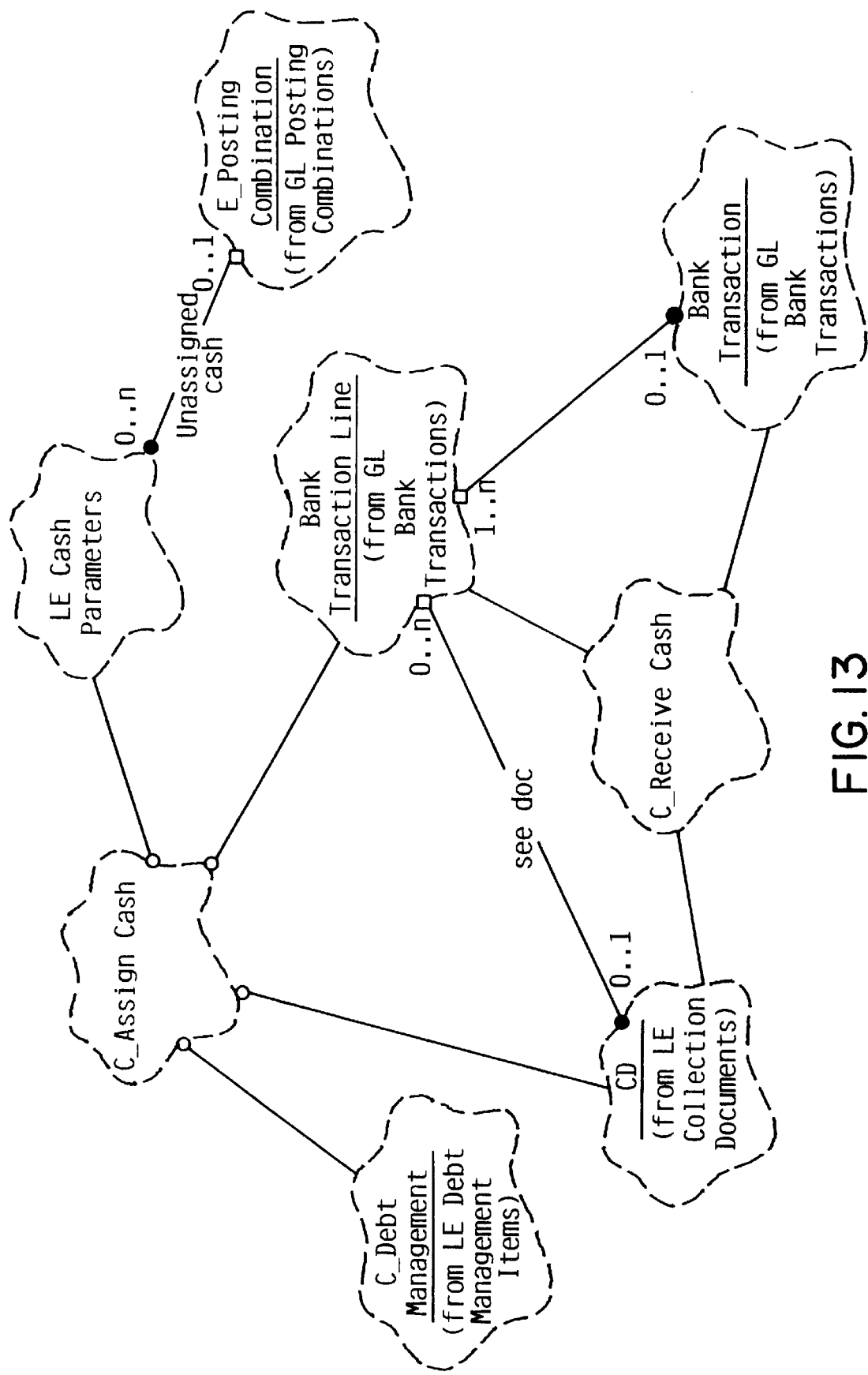
FIG. 13 is a class diagram of the LE Cash category illustrated in FIG. 4, showing the Assign Cash class and related classes.

FIG. 13 is a class diagram that illustrates the characteristics of the LE Cash category, which provides a means to apply cash that has been previously entered as a bank transaction line to specific business partner accounts. This category includes a control class called Assign Cash and a control class called Receive Cash. The Assign Cash class takes cash that has been entered on the system simply as bank transaction lines and applies the cash to business partner accounts. This class uses the subclass of Cash Parameters, which contains company level parameters required for assigning cash, for example, the posting combination to be cash not assigned to any business partner account. Assign Cash also uses the Bank Transaction Line class, which comprises entries on a bank deposit or withdrawal transaction that are for cash transactions, also uses Collection Documents, which are used to associate a collection document and the bank transaction line to update the collection document as appropriate, because cash potentially represents a payment covered by a collection document. Finally, the Assign Cash class uses the control class called Debt Management, which is created by the Assign Cash class after identifying the business partner account against which the cash on the bank transaction line is to be applied, to reflect payment to or from a business partner.

The Receive Cash class uses the classes illustrated in FIG. 13 as Bank Transaction, Bank Transaction Lines, and Collection Document. The Bank Transaction class is created to reflect an interaction with the bank. The Bank Transaction Lines class is created to reflect one or multiple individually identifiable instances of cash or check receipts associated with the bank transaction. The Collection Document can be generated to set details for later application of the cash to a business partner account.

j. LE Payments.

Figure 14:
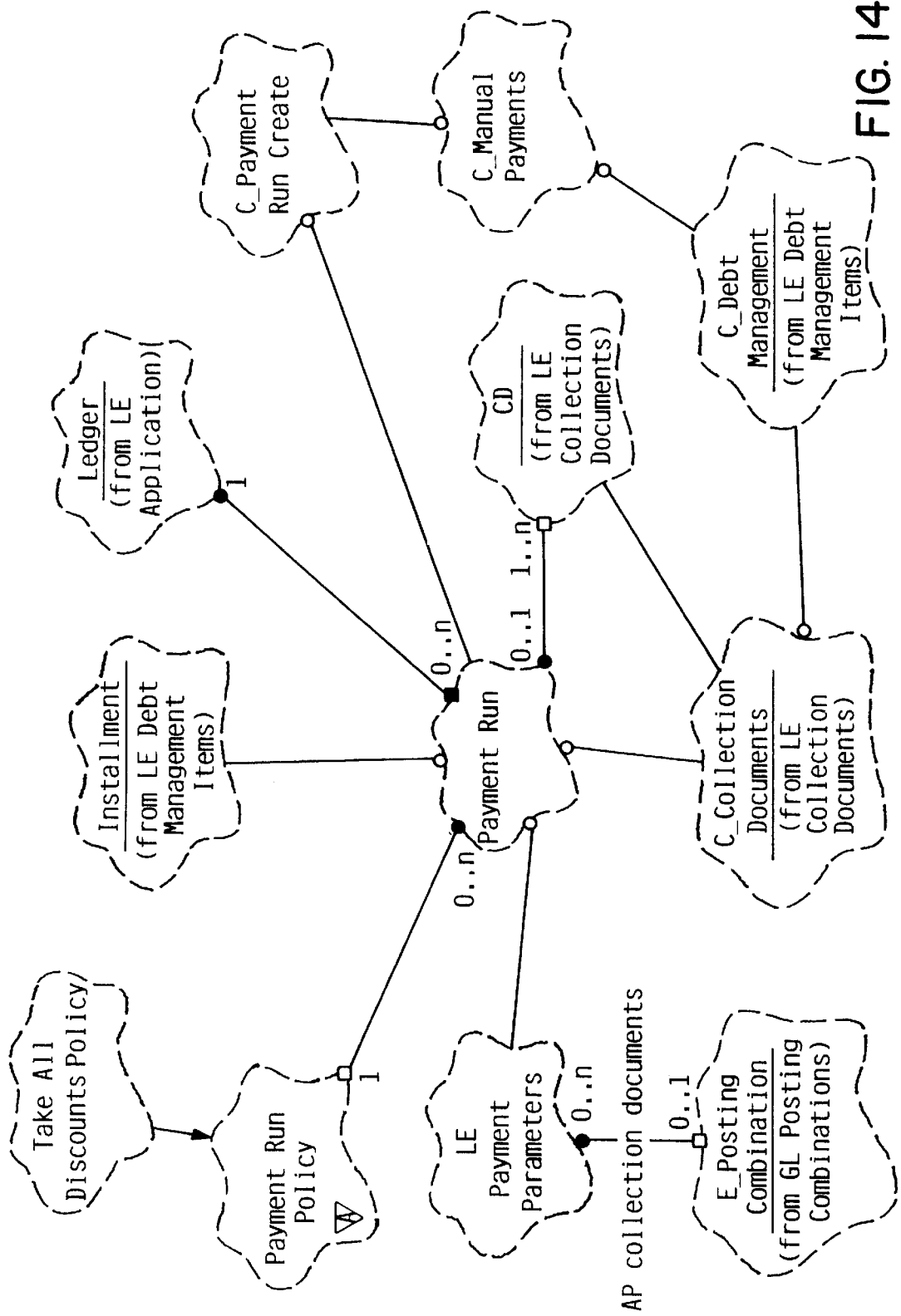
FIG. 14 is a class diagram of the LE Payments category illustrated in FIG. 4, showing the Payment Run class and related classes.

FIG. 14 is a class diagram that illustrates the characteristics of the LE Payments category, which provides the capabilities to select payments that are to be made to business partners, group them in payment runs, allow them to be reviewed and amended, and commit them to the payment process. This category creates collection documents for the proposed payments. The actual payment occurs through collection document processing. FIG. 14 shows the primary classes within this category to be a control class called Payment Run, a control class called Manual Payments, and a class called Ledger.

The Payment Run class selects the installments that are potentially to be paid in a payment run and creates a payment run linking these installments together. This is an area of the framework that will be highly customized by the application developer because the business rules for deciding what gets paid and when varies greatly from company to company. FIG. 14 shows that this class makes use or references classes called Payment Run, which groups together payments that are to be made to business partners for ease of processing and automated runs.

The Payment Run class uses or references classes called Installment, which identifies and selects the set of installments associated with debt management items that will be paid in this payment run; Payment Run Policy an extension point to the framework where the company policies relative to payments (for example, policies on taking discounts) is implemented, Payment Parameters, which contains the company level default parameters necessary for making payments. One of these parameters would provide the posting combination to be used if the payment amounts are to be accrued on collection documents until final payment is made. The Payment Run also makes use of the collection document class, which is created for each of these payments included in the run and associated with the payment run, and Collection Document Control, which controls the creation and processing of collection documents. In the preferred embodiment, it is used to create and maintain the collection documents that reflect run and to manage the actual payment of the selected installments. It also uses debt management item control to create new debt management log items for the recommended programs. The Manual Payments class makes use of a Payment Run control class to create a payment run containing only the payment(s) being manually created, and uses Debt Management Item, to set up the new debt management item that is being paid.

k. LE Collection Documents.

Figure 15A:
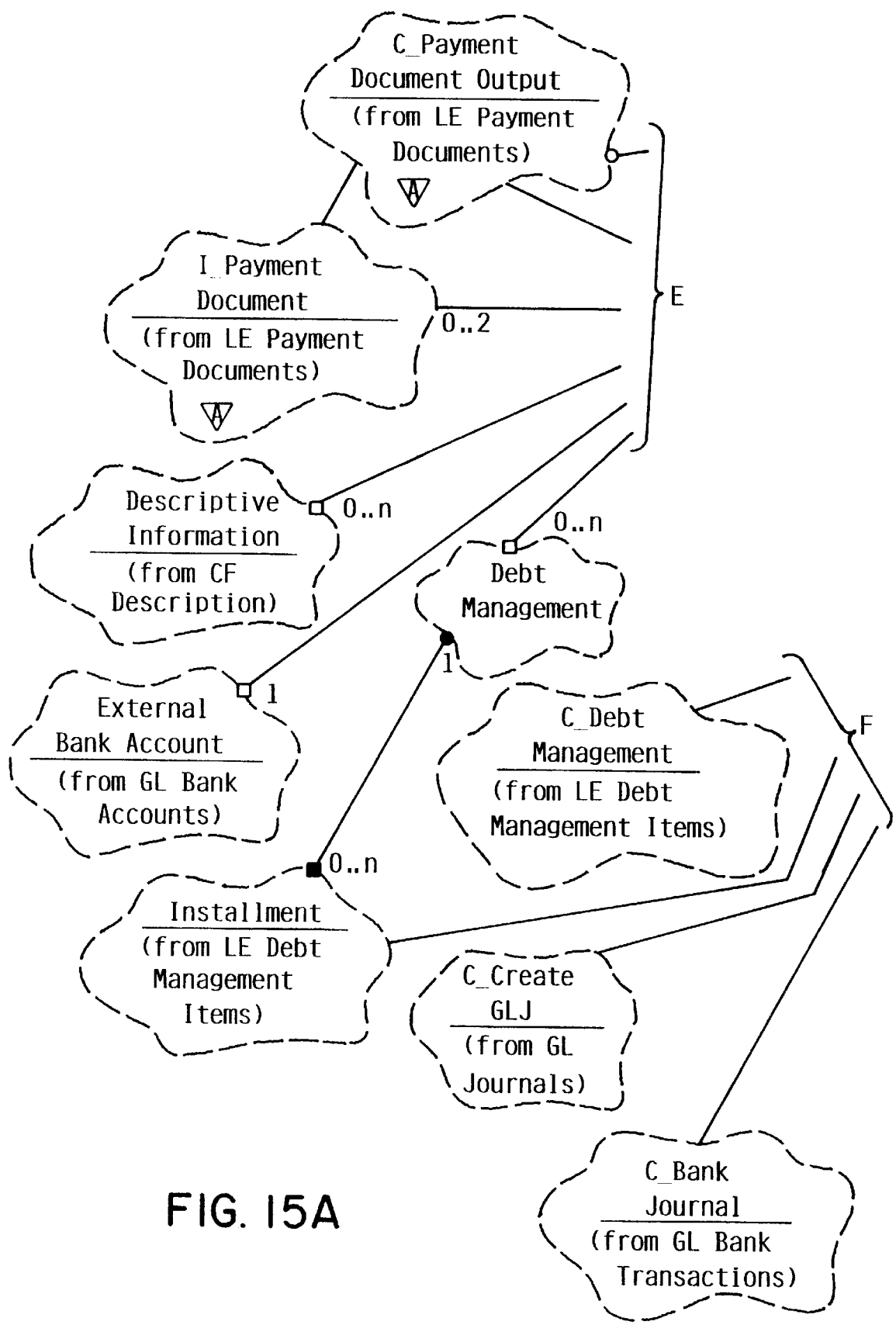
FIG. 15 is a class diagram of the LE Collection Documents category illustrated in FIG. 4, showing the Collection Documents class and related classes.
Figure 15B:
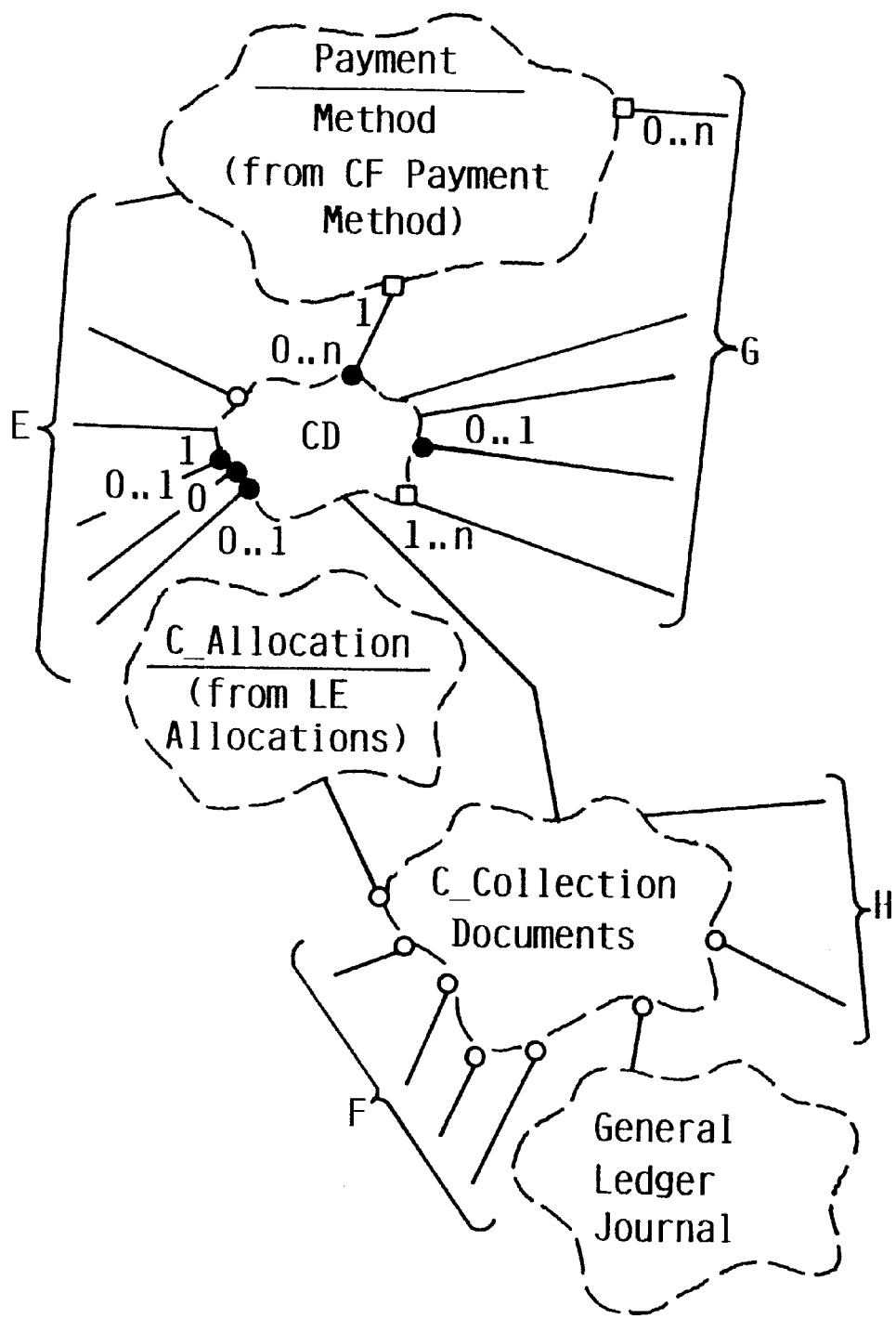
Figure 15C:
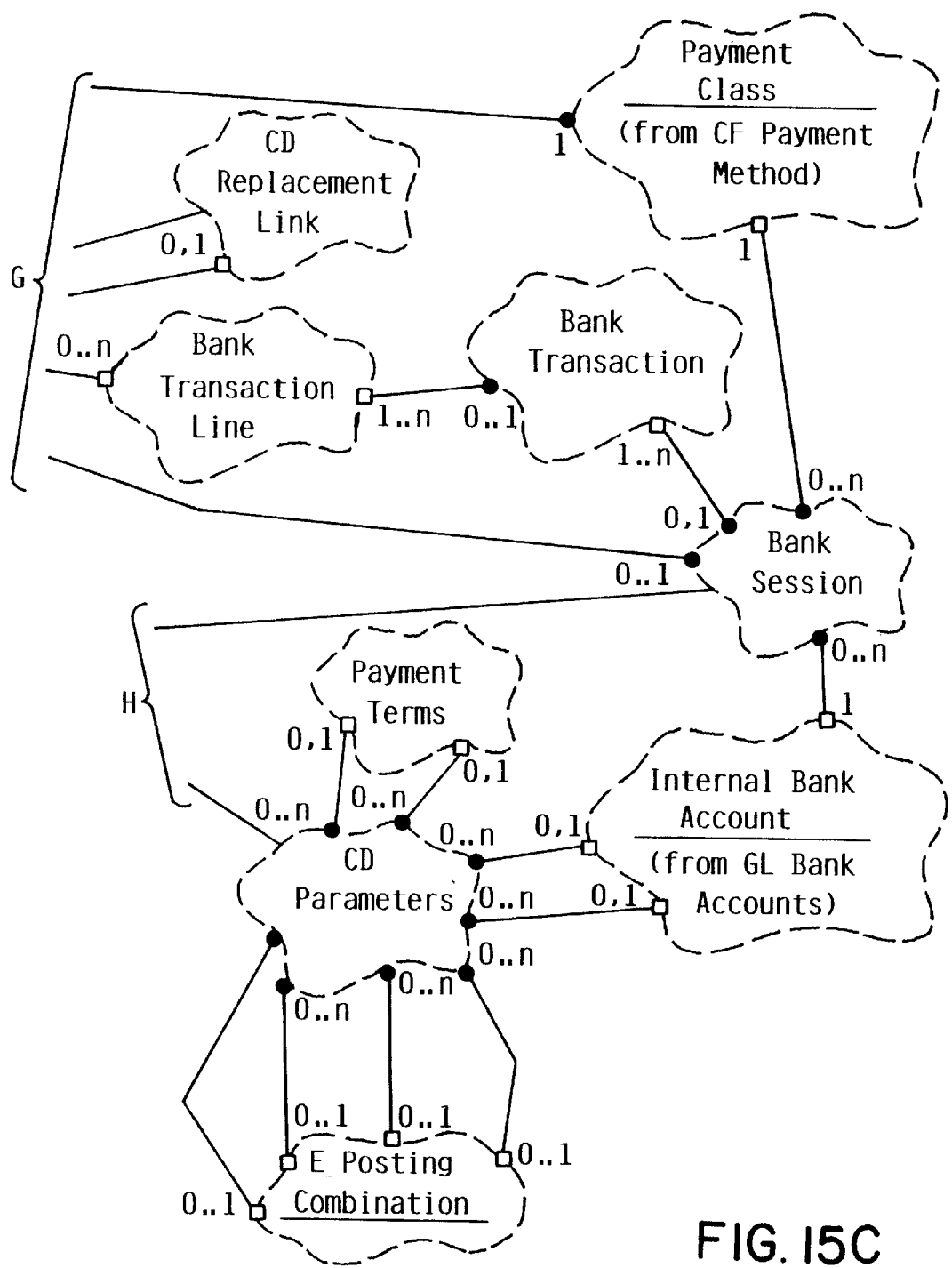

FIG. 15 is a class diagram that illustrates the characteristics of the LE Collection Documents category which manages the creation and processing of documents that are exchanged between business partners to make payments. This category can comprise documents that represent immediate payment, for example, a check from or to a business partner, or can be a document that represents deferred payment, for example, a bill of exchange with a customer or a supplier that will mature and then be paid or collected. FIG. 15 shows that this category includes a control class called Collection Document, which controls the creation, maintenance, and processing of collection document and uses a wide variety of classes.

As shown in FIG. 15, the Collection Documents class uses the CD Parameters class, which provides the company level default parameters required for collection documents. For example, the default payment terms to be applied for payments to or from business partners, the default company bank accounts to be used for making payments to a business partner or for depositing a payment from a business partner, and the default posting combinations to be used for creating general ledger dissections required by collection documents.

Two control classes used by the Collection Document class are called Debt Management Item and Allocation. These two control classes are used to create new debt management items and do allocations as required by the collection documents. Two offsetting debt management items are created. One is allocated with the installments to be paid by the collection document. The other is left as the outstanding open item on the business partner account.

Also used in this category is a control class called Create GL Journal and a class called General Ledger Journal. These classes create journals that reflect the status of the collection document. For example, the movement of the amount reflected on the collection document from the business partner control account to an outstanding collection document account. Another control class used is called Bank Journal, which creates general ledger journals to reflect the bank transactions created and associated with the collection documents.

A Bank Session class links together collection documents that mature on a specific date and are sent to the bank as a bank session. The control class called Collection Document creates and maintains the bank session which links together the collection documents and sends the collection documents to the bank when they mature. The Bank Session class also references classes called Internal Bank Account, Payment Class, and Bank Transaction.

The internal bank account class specifies the company bank account from which one or two payments are to be made. The payment class comprises documents that are included in a single bank session and will therefore be of a single payment class. A payment class can encompass multiple Payments Methods. A single bank transaction is created to combine payments made or received by a bank session on a specific maturity date. A Bank Transaction line is created for each collection document that matures on the date.

The Collection Document class showed in FIG. 15 represents a document that is exchanged with the business partner. This class contains data about the status, value, maturity dates, etc., and methods to act upon the data to mature the collection document. This class uses or references many items, listed below.

The Bank Transaction Line reflects payment of the collection document and was described above. The Debt Management Item class identifies the debt management item and their installments that are satisfied by the collection document. The external bank account class identifies the business partner bank account from which or to which a payment will be made. Descriptive Information Text describes the collection in the language associated with the active locale. The Payment Document Output control class creates or processes the final paper or electronic document that makes the payment. The payment document interface will reference the collection document for the information required. The Payment Method describes how the CD is to be paid, such as by check or bill of exchange. The CD replacement link, which links together two collection documents for traceability when one collection document is replaced by another for any reason.

l. LE Payment Documents.

Figure 16:
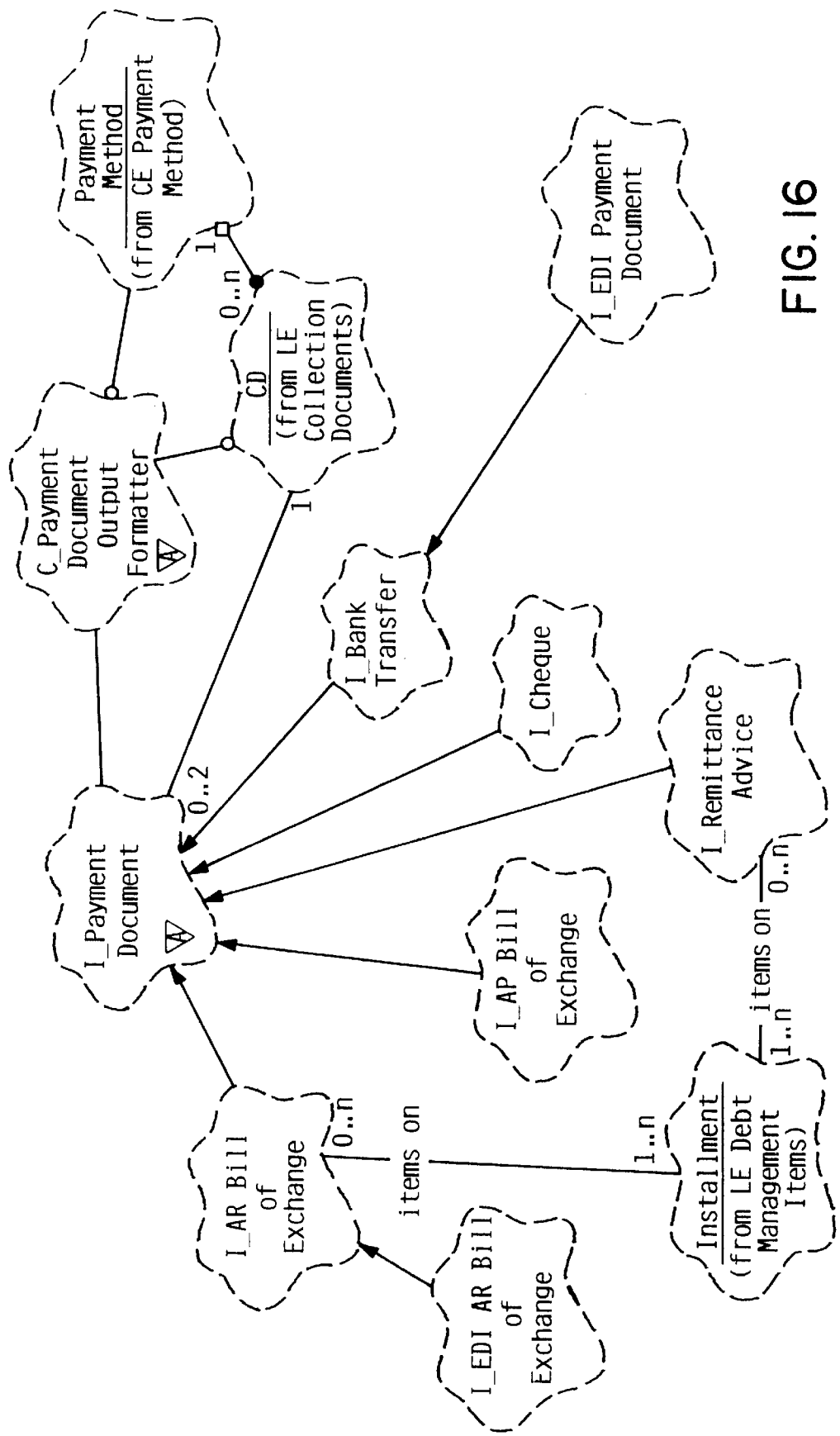
FIG. 16 is a class diagram of the LE Payment Documents category illustrated in FIG. 4, showing the Payment Document class and related classes.

FIG. 16 is a class diagram that illustrates the characteristics of the LE Payment Documents category, which formats the payment documents that are to be produced when using a particular payment method, such as check forms. The payment documents can relate to payments being made, such as for checks or bills of exchange, or may relate to payments being received, such as A/R bills of exchange or bank transfers. FIG. 16 shows that this category includes a control class called Payment Document Output Formatter. This control class formats the payment documents that are to be produced when using a particular payment method. The extended frameworks will have unique check forms and therefore this control class is an extension point for the framework.

FIG. 16 shows that this category includes classes called Payment Method and Payment Document Interface. The Collection Documents class references these two classes. The collections documents class references the Payment Method that describes how the payment should be made, such as by check or electronic funds transfer. The Payment Document Interface class provides the data and operations common to all types of payment document output formats, such as Business Partner name and address, company name and address, and the like.

The Payment Document Output Formatter class references a number of subclasses to perform its function of formatting payment documents. As noted above, the Payment Document Interface class is a point of extension for the framework. That is, this class is an abstract-base class. An abstract class represents a class that will be extended by the framework user to provide features specially selected by the framework user to add value to the resulting application program. Abstract classes will be designated in the drawings with an "A" enclosed in a triangle within a corresponding class cloud. A group of classes such as those likely to be added as extensions are illustrated in FIG. 16.

The exemplary extension classes shown in FIG. 16 include an AR Bill of Exchange interface class comprising a printed collection document used for collecting payments from a Business Partner. This class can be further specialized to provide a framework for electronic data interchange of this document with the Business Partner and will usually reference the installments being paid. The A/P Bill of Exchange interface class comprises a printed collection document used for collecting payments sent to a Business Partner, the Remittance Advice Interface Class comprises a document for printing that lists the installments being paid by a payment. The Check class comprises a printed form for payment to a Business Partner, and the Bank Transfer interface class comprises a transfer payment to the bank account of a Business Partner.

m. Cancellation.

Figure 17:
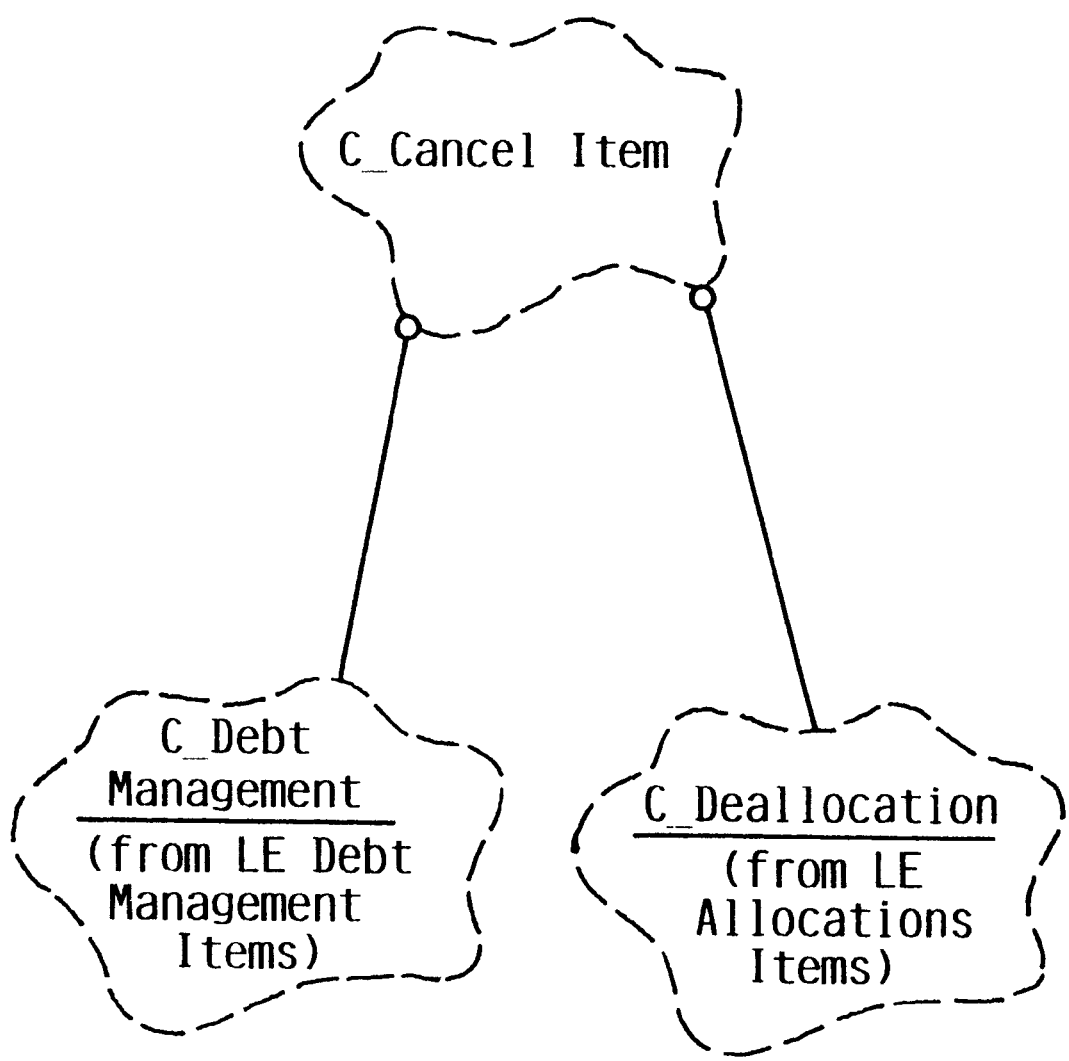
FIG. 17 is a class diagram of the LE Cancellation category illustrated in FIG. 4, showing the Cancellation class and related classes.

FIG. 17 is a class diagram that illustrates the characteristics of the Cancellation category which cancels an accounts receivable or accounts payable item, and reverses all allocations against the cancelled item. This category includes a control class called Cancel Item. This control class uses the Debt Management control class to find and remove a debt management item. It uses the control class called Deallocation to find and remove the allocations that have been made against the cancelled item.

n. Transfer Items.

Figure 18:
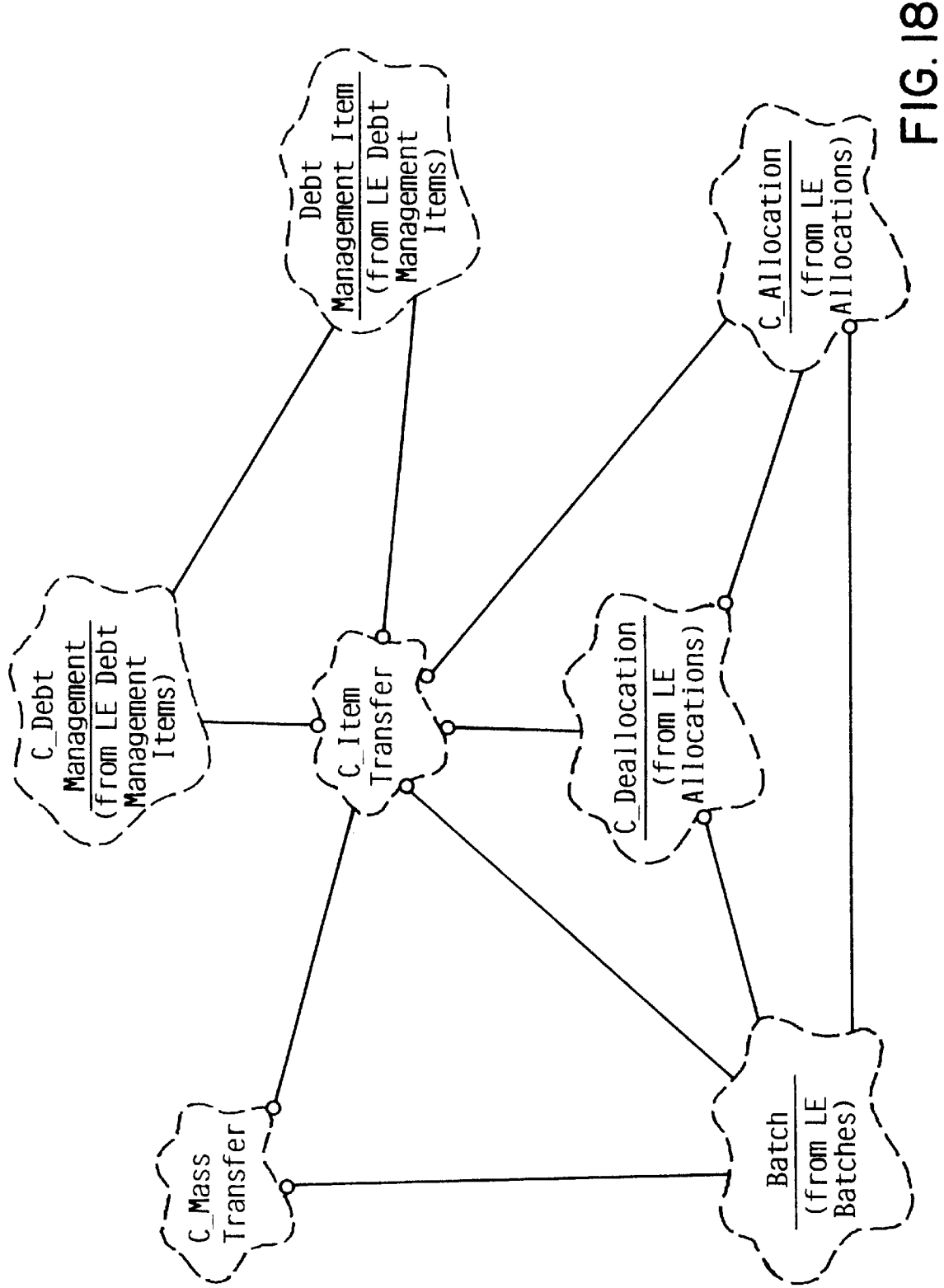
FIG. 18 is a class diagram of the LE Transfer Items category illustrated in FIG. 4, showing the Item Transfer class and related classes.

FIG. 18 is a class diagram that illustrates the characteristics of the Transfer Items category, which transfers an item from one Business Partner to another or transfers an item between control accounts for a Business Partner. This category includes a control class called Item Transfer, which performs the actions necessary to transfer Debt Management Items and their associated allocations from one Business Partner to another, and also a control class called Mass Transfer, which provides the capability for mass transfer of all Debt Management Items from one Business Partner to another.

FIG. 18 shows that the Item Transfer class uses or references the classes Debt Management Item, which is used to create Debt Management Items for a new Business Partner and to cancel those for a previous Business Partner, the Deallocation class, which reverses previously made allocations, the Allocation class, which makes applications corresponding to the deallocated items for a new Business Partner, and the Batch class, which comprises optional batch input controls for the items being transferred.

o. Revaluation.

Figure 19:
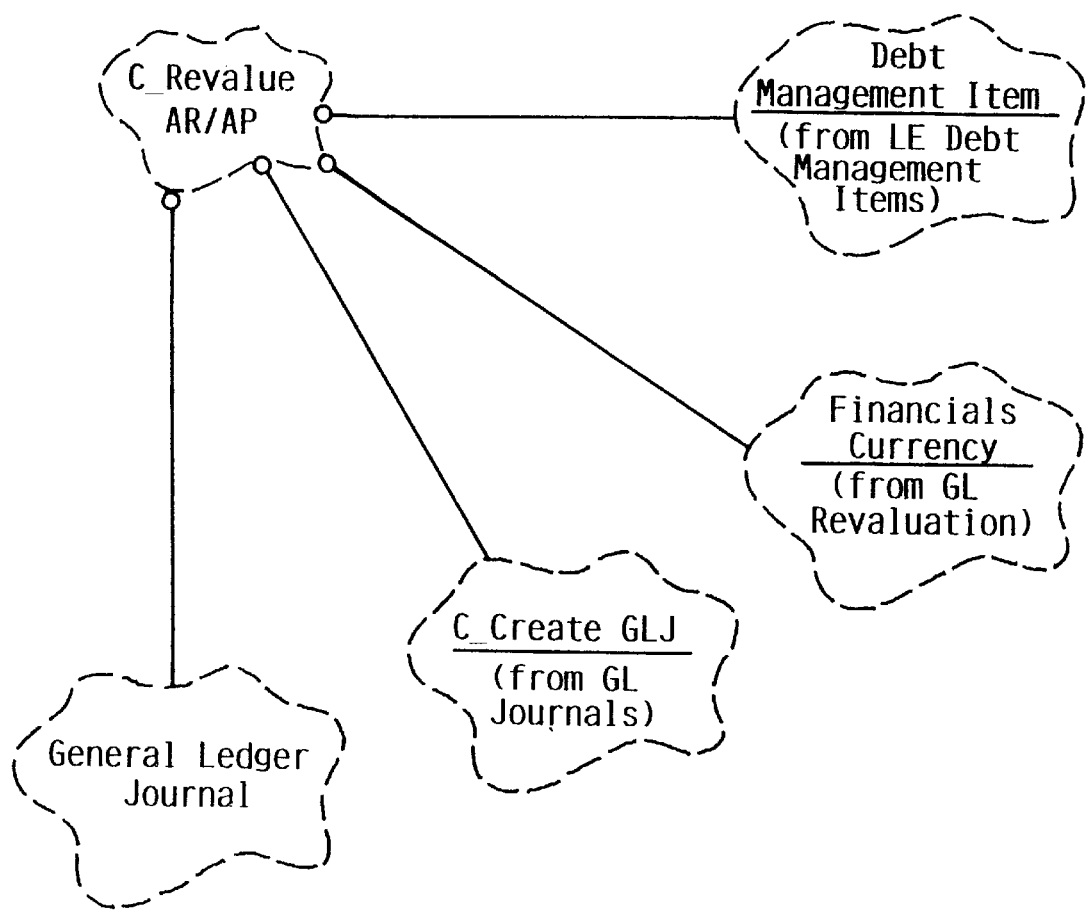
FIG. 19 is a class diagram of the LE Revaluation category illustrated in FIG. 4, showing the Revalue AR/AP class and related classes.

FIG. 19 is a class diagram that illustrates the characteristics of the Revaluation category, which converts the current prime balances on debt management details to a base currency and writes off the variance to current base to unrealized currency gain or loss. FIG. 19 shows that this category includes a control class called Revalue AR/AP. This control class controls the process of comparing the prime balance on the open debt management items to the current value for that balance in the base currency of the company and controls applying gains or losses. This class uses or references the Debt Management Items class and also the Financials Currency class, which is specific to the financial applications and inherits or uses the general currency capabilities in underlying common business objects and is used to perform conversion between two currencies. This class also uses the control class GL Journal Create, which is used to create the general ledger journals to reflect unrealized currencies and losses.

6. Processing of Extended Framework

As described above, the framework user will utilize the class and method definitions, with appropriate extensions and overrides, to produce a desired application program. Thus, as is the case with object oriented programming principles, details of the extended framework processing will depend on the particular extensions implemented by the framework user. Nevertheless, the processing enabled by the framework can be described in terms of the classes and methods defined by the present invention. Particular processing tasks performed by the extended system can be described in a step-wise, procedural fashion. The following description, therefore, should be understood to apply to the operating steps performed by the extended framework. Those skilled in the art, however, will understand that the flow of processing is not necessarily sequential through the flow diagram boxes, as objects will perform processing in accordance with their attributes and methods.

The framework classes define account setup and maintenance activities, ongoing payment activities, allocation and deallocation events, collections, and payment document activities. The account setup and maintenance activities include accounts receivable and accounts payable functions, audit logs, payment terms to be followed, budgets, and account profiles.

a. Operation of the Debt Management Controller.

Figure 20:
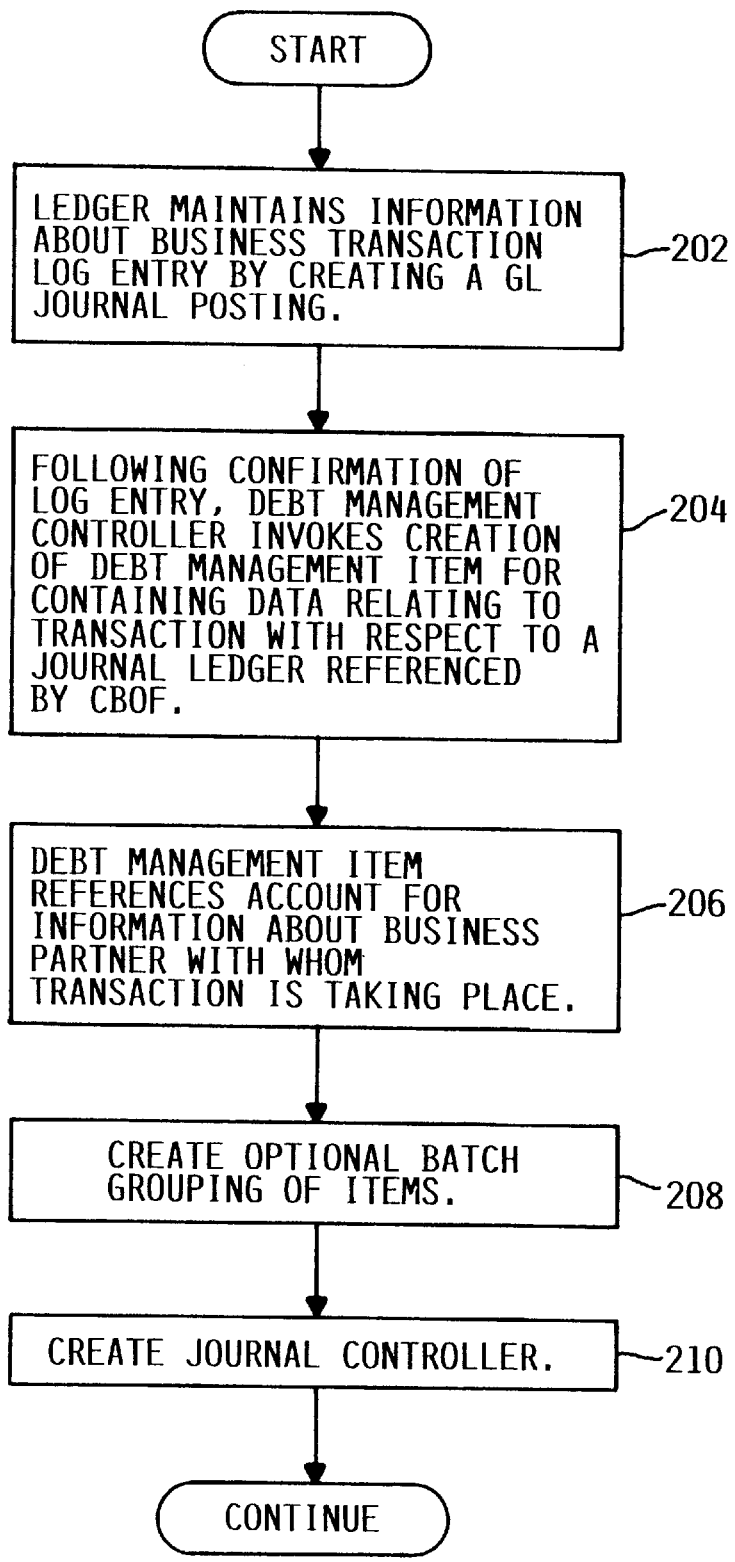
FIG. 20 is a flow diagram representation of the processing carried out by the LE Debt Management Items category illustrated in FIG. 8.

The application program to be generated from the framework is intended to help manage the details of the Company business transactions with the Company Business Partners. The framework keeps track of the transactions with members of the Debt Management Item class. That is, invoices sent or received, credit notes, purchase orders, and the like are represented by Debt Management Items. The creation of Debt Management Items is under the control of the Debt Management Controller. The processing of the Debt Management Controller is represented by the flow diagram of FIG. 20 following the start box.

A business transaction exists initially as a journal Log Entry until it has been confirmed, at which time it is stored in the computer system memory as a Debt Management Item. Thus, the first step illustrated in the Debt Management processing diagram of FIG. 20 (box 202) is for a Ledger object to maintain information about the business transaction log entry by creating a General Ledger (GL) Journal posting. The creation of this posting can be implemented by the shared core objects (CF) described above. Generally, user interaction prompts such initial processing. In particular, the application program user will communicate the desire for ledger creation and porting through the user interface, which can be crafted by the application program developer according to well-known programming techniques. For example, a graphical user interface may be presented to the application user on a display such as illustrated in FIG. 2. In the preferred embodiment, an application user that is a client of a server is not permitted to create persistent data objects. Therefore, after the object oriented programming environment is established, any persistent objects must be created and stored in the server. Thus, an application user in a client-server environment must provide the data necessary for creation of the desired object to the server. The server will then invoke a command that will call the object method, pass the received information, and cause creation of the specified object. In the preferred embodiment, the GL Journal posting is handled by objects of the companion General Ledger framework, such as described in the co-pending patent application referenced above. This portion of Debt Management processing is represented by the FIG. 20 flow diagram box numbered 202.

Next in the Debt Management processing, after confirmation of the Log Entry, the Debt Manager Controller object invokes the creation of a Debt Management Item for containing data relating to a business transaction with respect to a journal ledger referenced by the core business objects (CF). That is, the AR/AP program of the invention learns of a business transaction and references a previously-created journal object that was created by the CF to create a Debt Management Item. The Debt Management Item will maintain an Item Audit Log to make a record of changes made. The processing is represented by the FIG. 20 flow diagram box numbered 204.

The next step, represented by the flow diagram box numbered 206, is for the Debt Management Item to reference the appropriate Account object for information about the Business Partner with whom the transaction is taking place. In the next processing step illustrated, the Debt Management Controller optionally creates Batch groupings of items for processing. This processing step is represented by the flow diagram box numbered 208. Finally, the Debt Management Controller creates the Journal Controller objects needed for the application program. This processing step is represented by the flow diagram box numbered 210. Processing then resumes with the continuation block.

b. Allocation and Deallocation Processing.

When a business transaction is received, it must be allocated and then deallocated against a Business Partner account in accordance with processing by the Debt Management Item Controller and the Allocation Control and Deallocation Control objects. For example, a payment received from a Business Partner is allocated against one or more invoices, which are to be deallocated from the Business Partner account. This processing is represented by the flow diagram of FIG. 21.

Figure 21:
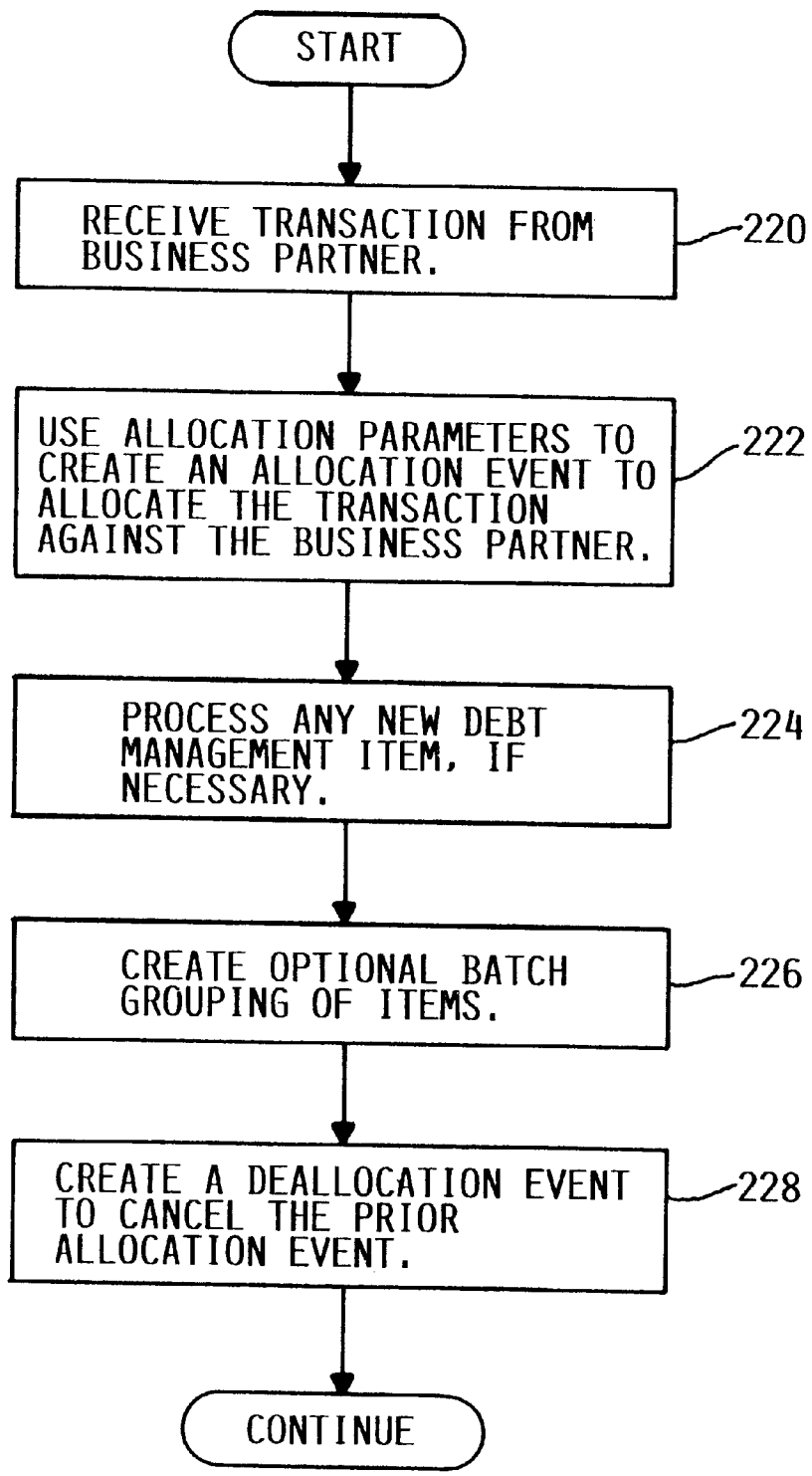
FIG. 21 is a flow diagram representation of the processing carried out by the LE Allocations category illustrated in FIG. 12.

The first step of allocation/deallocation processing is to receive details of the business transaction. Such data would be received in the extended framework by an Allocation Control object. This processing is represented by the flow diagram box numbered 220. Next, the computer system uses the Allocate Parameters class members to create an Allocate Event and allocate the business transaction against the Business Partner. This processing is represented in FIG. 21 by the flow diagram box numbered 222.

The allocation may trigger creation of new debt management adjustments, such as in the event of a currency evaluation gain or loss. Therefore the next step of processing is to process any Debt Management Items, if necessary, as represented by the flow diagram box numbered 224. Next, optional batch processing of allocations may be performed. This processing is represented by the flow diagram box numbered 226. Lastly, the Allocation Event is removed by the creation of a Deallocation Event, as represented by the FIG. 21 flow diagram box numbered 228.

c. Cash Processing.

When cash payments are received, they must be entered in the accounts of the appropriate Business Partners. This is the responsibility of the Cash category illustrated in FIG. 13. These classes carry out processing to make the correct entry of cash payments. The processing steps performed are represented by the flow diagram of FIG. 22.

The first step of cash processing is when the Receive Cash Control object records the receipt of the cash payment. The Receive Cash Control object may create a Bank Transaction object to carry out the transaction with the Company bank and may create a Bank Transaction Lines object to reflect one or more instances of received cash for the transaction. This processing is indicated in the flow diagram box numbered 240.

Figure 22:
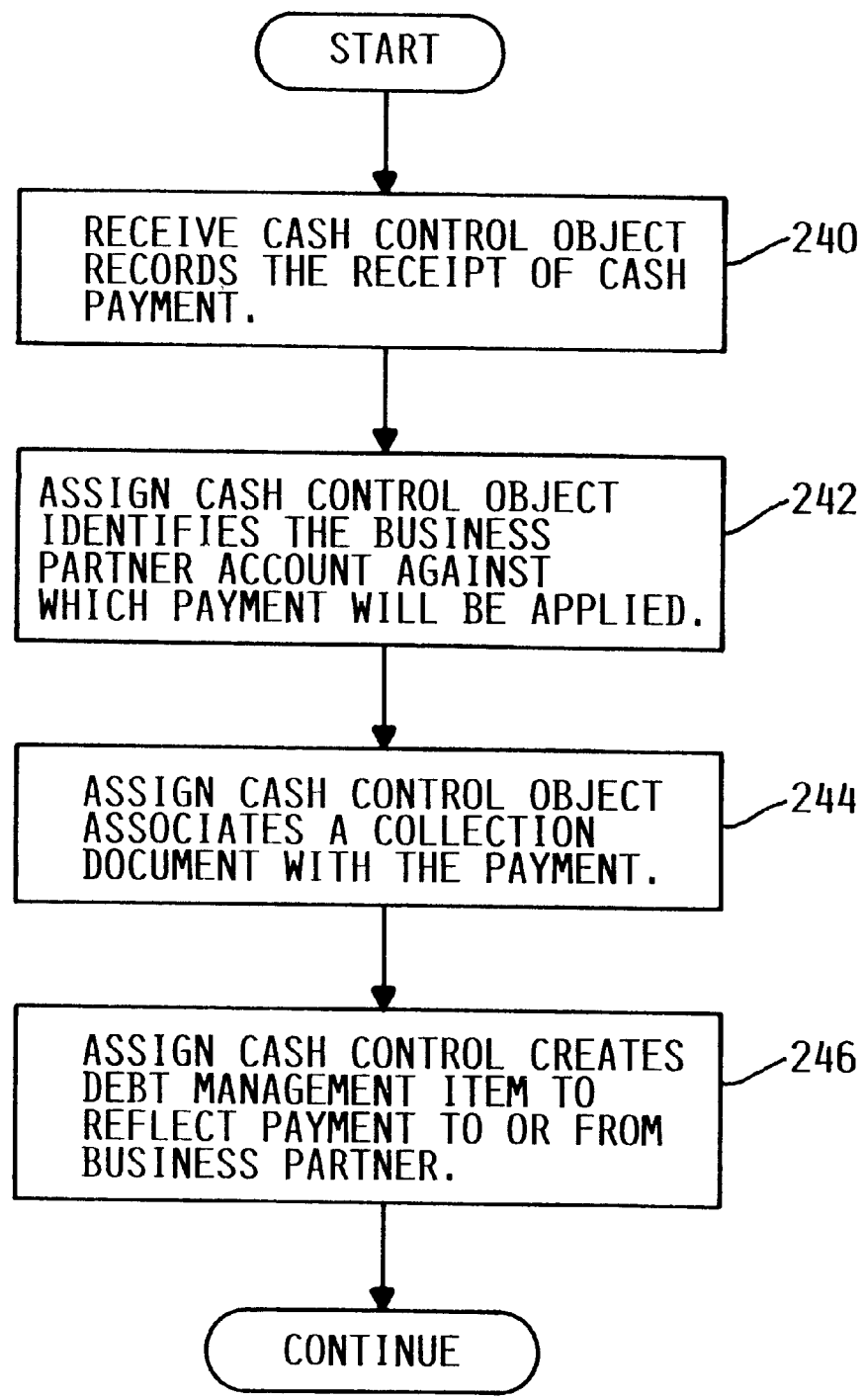
FIG. 22 is a flow diagram representation of the processing carried out by the LE Cash category illustrated in FIG. 13.

Next, an Assign Cash Control object identifies the Business Partner account against which the received cash is to be applied, as represented by the FIG. 22 flow diagram box numbered 242. The Assign Cash Control object also might associate a Collection Document with the received cash; this processing is represented by the flow diagram box numbered 244. Finally, the Assign Cash Control object creates a Debt Management Item to reflect the payment to or from the Business Partner involved, as represented by the flow diagram box numbered 246. Processing then continues.

d. Payment Processing.

Figure 23:
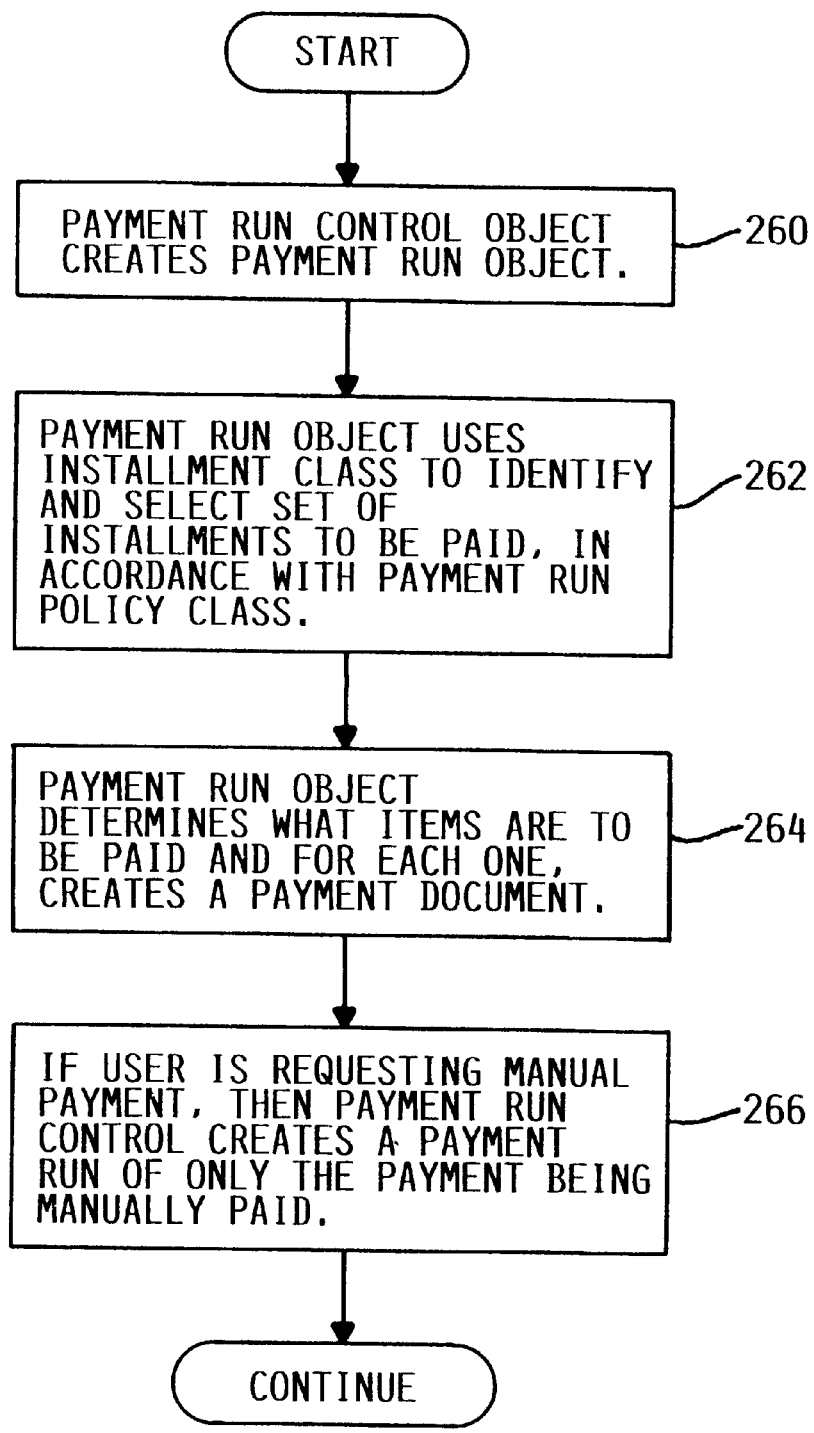
FIG. 23 is a flow diagram representation of the processing carried out by the LE Payments category illustrated in FIG. 14.

The framework of the invention permits payments to be made selectively against installments, permits them to be grouped, and applied against collection documents. The processing to achieve this is represented by the Payment Processing flow diagram of FIG. 23.

The first step of payment processing is represented by the flow diagram box numbered 260, which indicates that the Payment Run Control object creates a Payment Run object. Next, the Payment Run object uses the Installment objects to identify and select a set of installments to be paid, in accordance with the Payment Run Policy class. This processing step is represented by the flow diagram box numbered 262. In the next processing step, represented by the flow diagram box numbered 264, the Payment Run object creates a Collection Document object for each payment included in the payment run.

The payment processing in accordance with the framework permits manual payments, and therefore the next processing step comprises determining if the user is requesting manual payment to be performed. If so, the Manual Payment Control class creates a payment run of only the payment being manually paid against a Debt Management Item. This processing is represented by the FIG. 23 flow diagram box numbered 266. Program processing then continues.

e. Collection Documents and Payment Document Processing.

Payments (such as manual payments or installments described above) are made in the extended framework by exchanging payment documents between the Company and Business Partners. The payment documents are members of the Collection Documents class and can represent immediate payment or a deferred payment. The flow diagram of FIG. 24 represents the processing of the Collection Documents and Payment Document categories.

Figure 24:
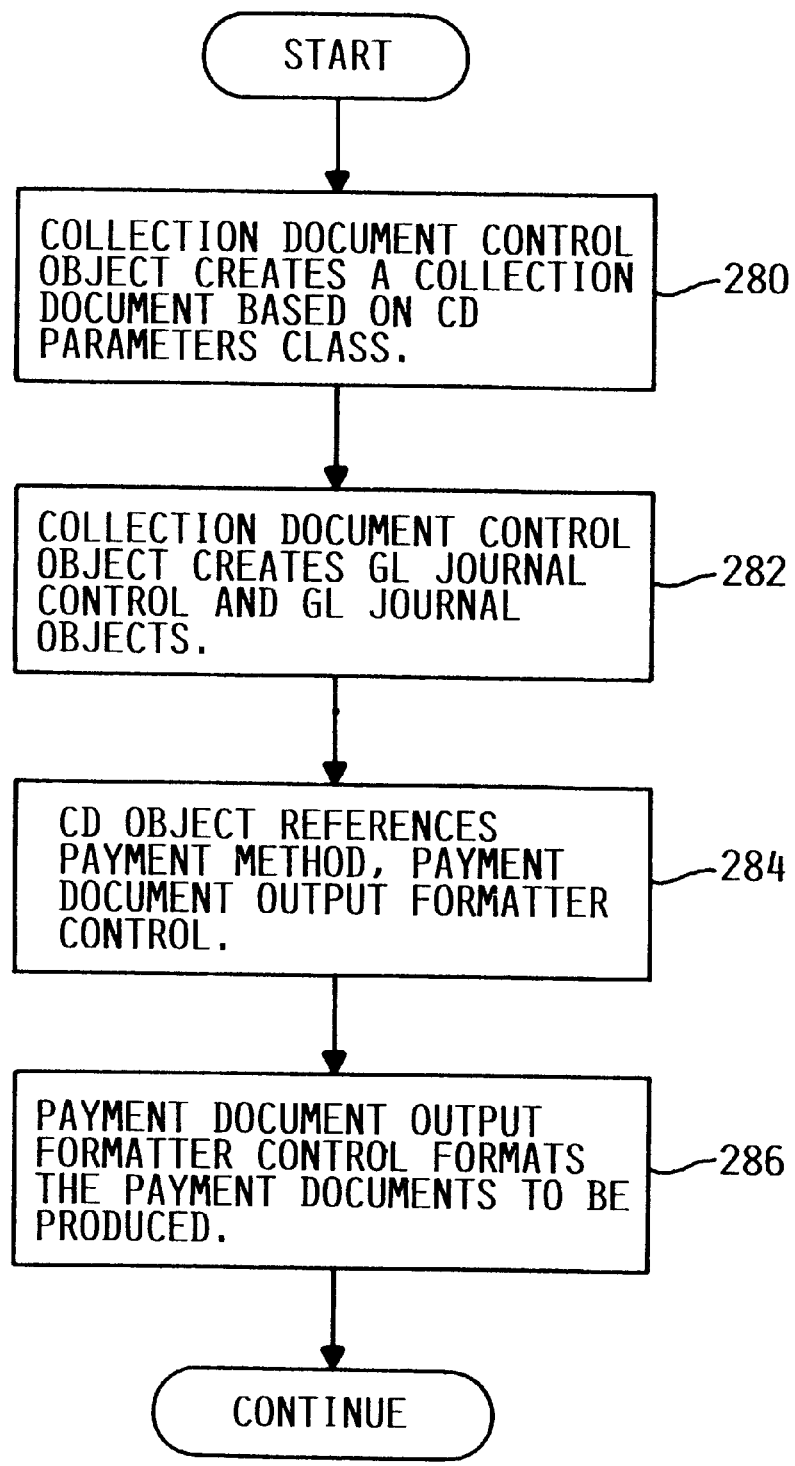
FIG. 24 is a flow diagram representation of the processing carried out by the LE Collection Documents and LE Payment Document categories illustrated in FIG. 15 and FIG. 16, respectively.

Collection document processing begins with a Collection Document (CD) Control object creating a Collection Document based on the CD Parameters class, as indicated by the flow diagram box numbered 280 in FIG. 24. The CD Parameters will specify items such as payment terms, bank accounts of Company in making payment, and default posting combinations. The next step is for the Collection Document Control object to keep track of the Collection Document status. In the preferred embodiment, the Collection Document Control object does this by creating a General Ledger Journal Control object and a General Ledger Journal object, part of the common, shared Common Business Objects Framework (CBOF) with which the preferred embodiment interfaces. This processing is represented by the flow diagram box numbered 282.

Next, the Collection Document references objects of the classes Payment Method, Payment Document Interface, and Payment Document Output Formatter Control to create Payment Documents for the payment of transactions. This processing step is represented by the flow diagram box numbered 284. Lastly, the Payment Document Output Formatter Control object formats the payment documents to be produced in accordance with extensions decided upon by the application developer/framework user. This is represented by the flow diagram box numbered 286.

f. Transfer Items Processing.

A user might want to transfer a transaction item from one Business Partner to another, or from one account of a Business Partner to another account of the same Business Partner. In the framework, this processing is carried out by the Transfer Items category, whose processing steps are represented in the flow diagram of FIG. 25.

Figure 25:
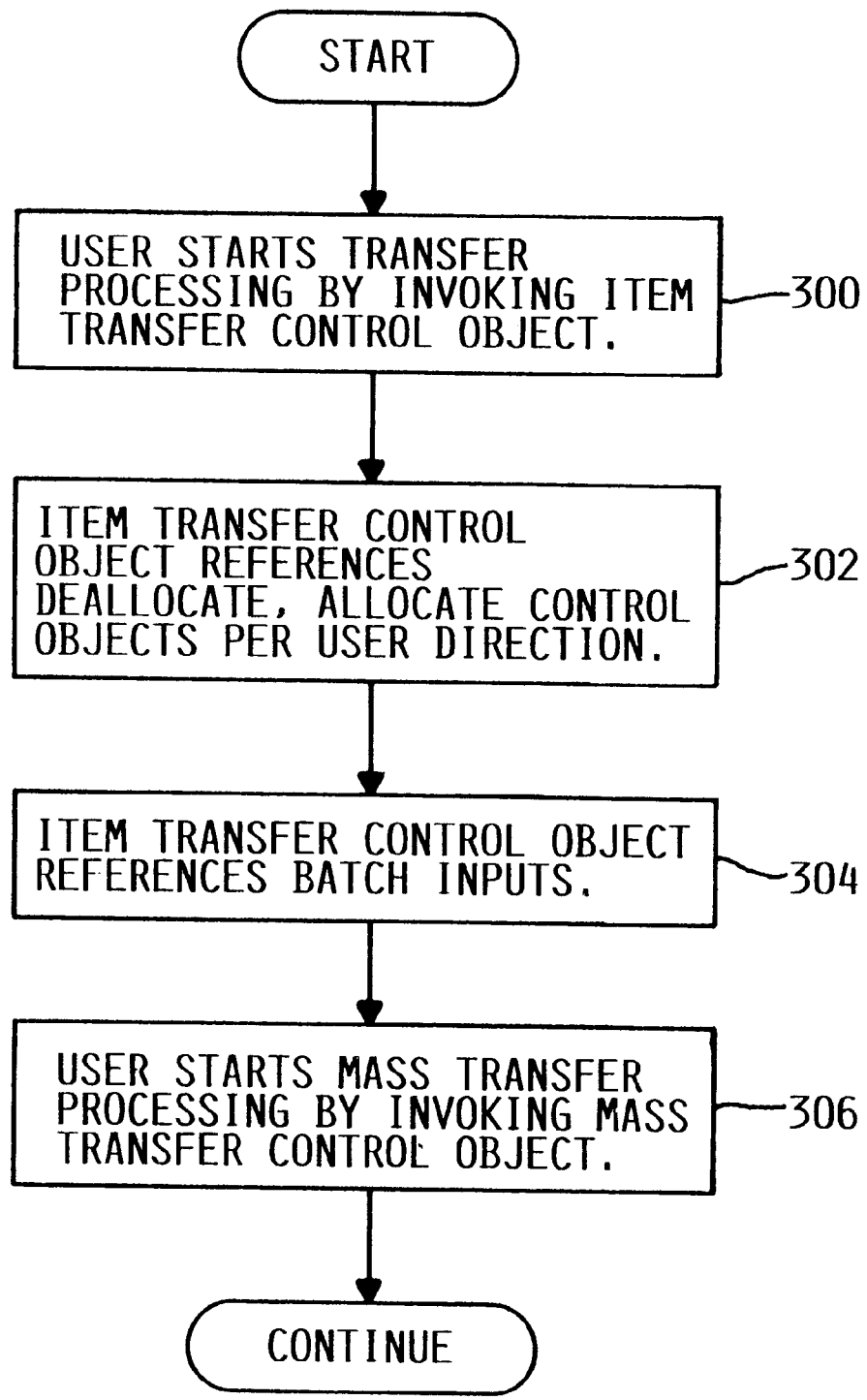
FIG. 25 is a flow diagram representation of the processing carried out by the LE Transfer Items category illustrated in FIG. 18.

The first processing step illustrated in FIG. 25 assumes that the program user has decided to transfer selected items from one Business Partner to another. Accordingly, the first flow diagram box numbered 300 indicates that the user starts transfer processing by invoking an Item Transfer Control object. This may be initiated, for example, by the user making a selection through the user interface of the application program using the computer system shown in FIG. 2.

Next, the Item Transfer Control object references Deallocate and Allocate Control objects in accordance with user direction to selectively reverse previous allocations and redirect items from one partner to another, respectively. This processing is represented by the flow diagram box numbered 302. The framework optionally supports batch transfers, so the next processing step illustrated (box 304) indicates the Item Transfer Control object references inputs of the Batch class.

Finally, the framework supports mass transfer of items from one Business Partner to another. The flow diagram box numbered 306 indicates the application program user starts the mass transfer processing by invoking the Mass Transfer Control object. Processing then continues.

g. Revaluation Processing.

The framework supports converting current balances on debt management item details from a foreign currency to a base currency and writing off unrealized currency gain or loss. The framework does this through the Revaluation category, whose processing steps are represented by the flow diagram of FIG. 26.

Figure 26:
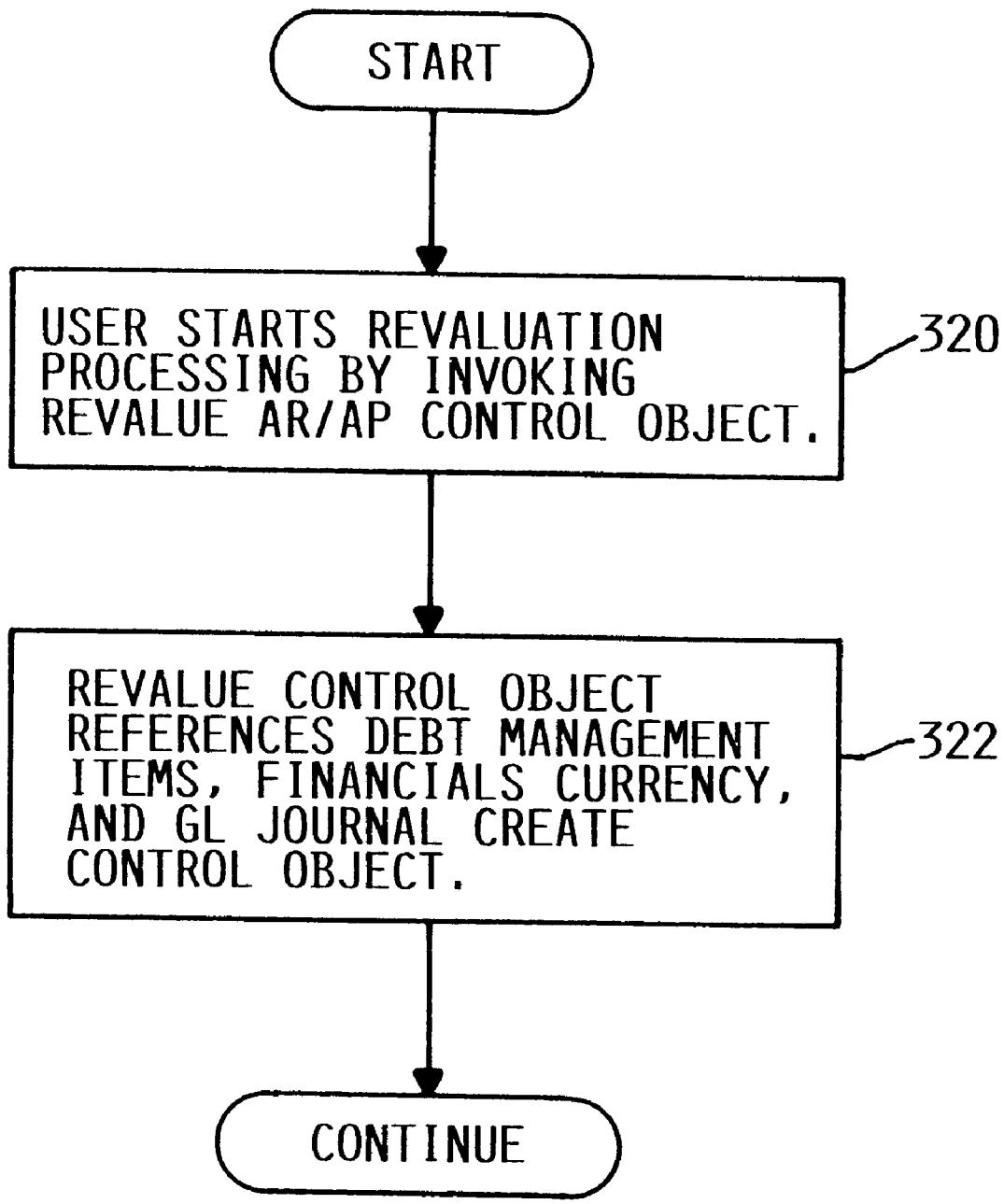
FIG. 26 is a flow diagram representation of the processing carried out by the LE Cancellation category illustrated in FIG. 17.

The first processing step illustrated in FIG. 26 assumes that the program user has decided to revalue selected debt management items from one Business Partner to another. Accordingly, the first flow diagram box numbered 320 indicates that the user starts revaluation processing by invoking a Revalue AR/AP Control object. This may be initiated, for example, by the user making a selection through the user interface of the application program using the computer system shown in FIG. 2.

Next, the Revalue AR/AP Control object references Debt Management Item objects, Financials Currency objects, and GL Journal Create Control objects in accordance with user direction to selectively revalue debt management items. This processing is represented by the flow diagram box numbered 322. Processing then continues.

h. Cancellation Processing.

A user might want to reverse all allocations made against a business transaction. Therefore, the framework supports reversing all allocations in response to user request. The framework does this through the Cancellation category, whose processing steps are represented by the flow diagram of FIG. 27.

Figure 27:
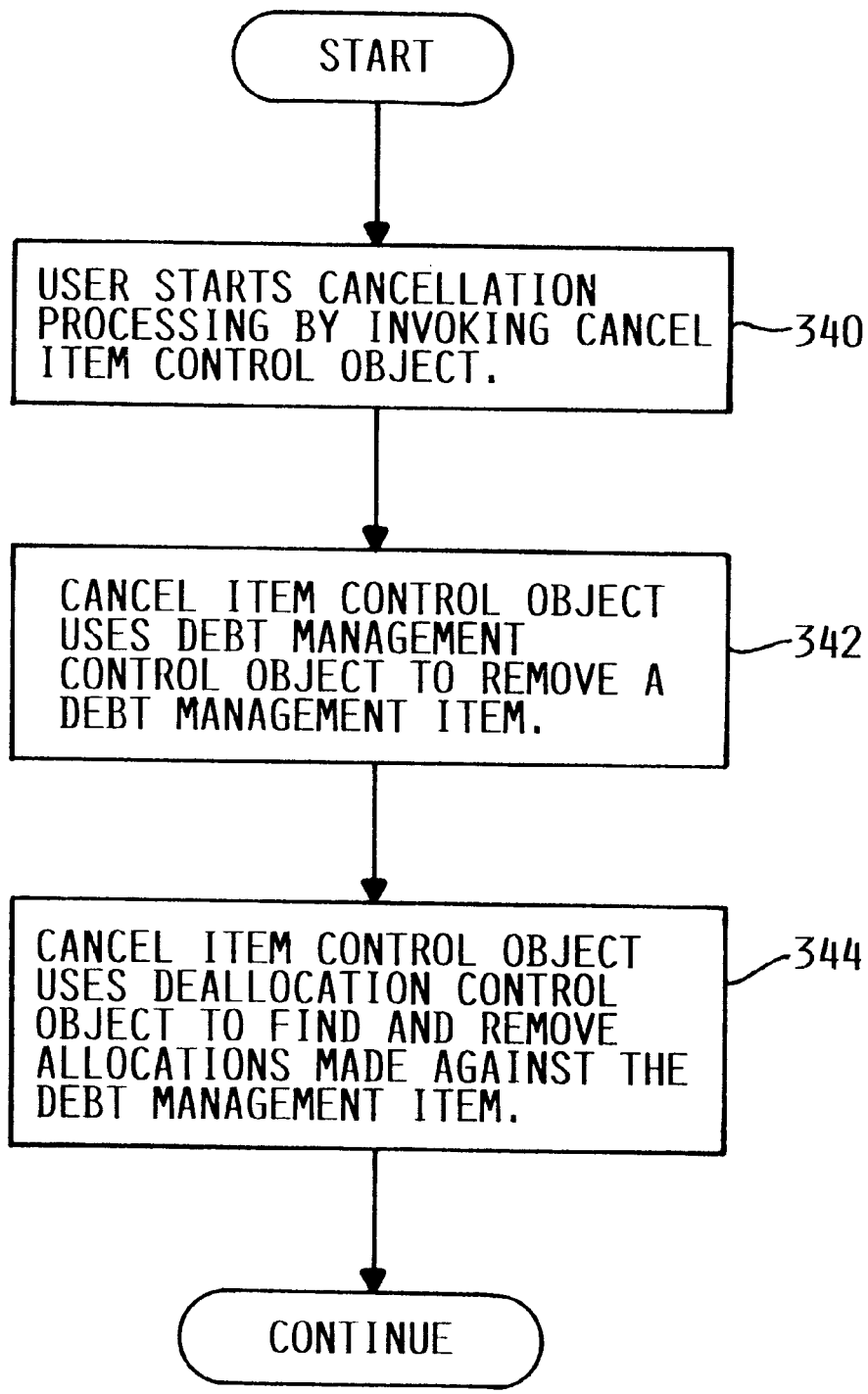

The first processing step illustrated in FIG. 27 assumes that the program user has decided to cancel allocations made against a business transaction. Accordingly, the first flow diagram box numbered 340 indicates that the user starts cancellation processing by invoking a Cancel Item Control object. This may be initiated, for example, by the user making a selection through the user interface of the application program using the computer system shown in FIG. 2.

Next, at the flow diagram box numbered 342, the Cancel Item Control object uses a Debt Management Control object to remove a debt management item. In the next processing step, the Cancel Item Control object uses a Deallocate Control object to find and remove allocations made against the debt management item.

ADVANTAGES OF THE INVENTION

Thus, the reusable framework of the invention provides a set of objects that perform account management functioning and permit a framework user to add extensions to the framework for specific processing features, thereby producing an account management application program for managing the ledger accounts of a company, including accounts receivable and accounts payable. An application program developer can thereby more quickly conclude program development and maintain programs with updates and improvements. The developer must provide the end-user interface, which establishes a means for the end-user to communicate with the application program to receive, process, and report data. The program developer is thereby free to concentrate on application program features, building upon the framework.

We claim:

1. A computer system comprising:
   a central processing unit;
   a user interface; and
   a main memory having an operating system that supports an object oriented programming environment containing an object oriented framework that provides an extensible business financial account management system, the object oriented framework comprising a set of object oriented classes including at least one user-extensible class that a user of the framework can extend using object oriented principles of inheritance to define a business financial account management application, wherein the system provides an extensible business financial account management system by maintaining a Ledger Account Application category of cooperating objects that contain business financial accounts data and perform accounts receivables and accounts payable operations on the business financial accounts data, wherein the Ledger Account Application category of cooperating objects comprises an Account object class that specifies an account structure for containing accounts receivables, accounts payable, company identification, and business partner identification data to specify the business financial accounts data, wherein the system further comprises a Debt Management Items category of cooperating objects that reference transactions between a company and a business partner and a Log Entry category of cooperating objects that identifies the transaction prior to a commit operation on the transaction.

2. A computer system as defined in claim 1, further including a Payments category of cooperating objects that permits selection of payment transactions to be made to business partners and grouping of such payments.

3. A computer system as defined in claim 2, wherein the Payments category includes a Manual Payments Control class that creates an accounts receivable/accounts payable transaction entry and causes it to be paid immediately in a single step.

4. A computer system as defined in claim 1, further including a Collection Documents category of cooperating objects that creates accounting document cooperating objects for exchange between business partners to effectuate payment with respect to the Debt Management Items class of cooperating objects.

5. A computer system as defined in claim 1, wherein the Debt Management Items category further includes a Posting Combination class that identifies a general ledger account against which an installment payment will be applied.

6. A computer system as defined in claim 1, further including a Log Entry category of cooperating objects that identifies a transaction with respect to a Ledger object class of cooperating objects.

7. A computer system as defined in claim 1, further including a Batch category of cooperating objects that identifies a group of transactions for joint processing, including start, suspend, restart, and commit operations.

8. An object oriented extensible business financial ledger account management framework for use in a computer system having an operating system that supports an object oriented programming environment and includes a memory in which cooperating objects comprising object classes can be stored, the object oriented framework comprising a set of object oriented classes including at least one user-extensible class that a user of the framework can extend using object oriented principles of inheritance to define a business financial account management application, the framework comprising a Ledger Account Application category of cooperating objects that contain business financial accounts data and perform accounts receivables and accounts payable operations on the business financial accounts data, wherein the Ledger Account Application category of cooperating objects comprises an Account object class that specifies an account structure for containing accounts receivables, accounts payable, company identification, and business partner identification data to specify the business financial accounts data, the framework further comprising a Debt Management Items category of cooperating objects that reference transactions between a company and a business partner and a Log Entry category of cooperating objects that identifies the transaction prior to a commit operation on the transaction.

9. A framework as defined in claim 8, further including a Collection Documents category of cooperating objects that creates accounting document cooperating objects for exchange between business partners to effectuate payment with respect to the Debt Management Items class of cooperating objects.

10. A framework as defined in claim 8, further including a Log Entry category of cooperating objects that identifies a transaction with respect to a Ledger object class of cooperating objects.

11. A framework as defined in claim 8, further including a Batch category of cooperating objects that identifies a group of transactions for joint processing, including start, suspend, restart, and commit operations.

12. A framework as defined in claim 8, further including a Payments category of cooperating objects that permits selection of payment transactions to be made to business partners and grouping of such payments.

13. A framework as defined in claim 12, wherein the Payments category includes a Manual Payments Control class that creates an accounts receivable/accounts payable transaction entry and causes it to be paid immediately in a single step.

14. A framework as defined in claim 8, wherein the Debt Management Items category further includes a Posting Combination class that identifies a general ledger account against which an installment payment will be applied.

15. A method of executing a software build process in a computer system having a central processing unit that controls processing in the computer system, a user interface, and a main memory having an operating system that supports an object oriented programming environment, the method comprising the steps of:

providing an object oriented framework, the object oriented framework comprising a set of object oriented classes including at least one user-extensible class that a user of the framework can extend using object oriented principles of inheritance to define a business financial account management application, the object oriented framework having a ledger account Application category of cooperating objects that contain business financial accounts data and perform accounts receivables and accounts payable operations on the business financial accounts data, wherein the Ledger Account Application category of cooperating objects comprises an Account object class that specifies an account structure for containing accounts receivables, accounts payable, company identification, and business partner identification data to specify the business financial accounts data, wherein the Ledger Account Application category of cooperating objects further comprises a Debt Management Items category of cooperating objects that reference transactions between the company and a business partner and a Log Entry category of cooperating objects that identifies the transaction prior to a commit operation on the transaction; and extending the framework using object oriented principles of inheritance and producing an application program.

16. A method as defined in claim 15, wherein the Debt Management Items category further includes a Posting Combination class that identifies a general ledger account against which an installment payment will be applied.

17. A method as defined in claim 15, further including a Log Entry category of cooperating objects that identifies a transaction with respect to a Ledger object class of cooperating objects.

18. A method as defined in claim 15, further including a Batch category of cooperating objects that identifies a group of transactions for joint processing, including start, suspend, restart, and commit operations.

19. A method as defined in claim 15, further including a Collection Documents category of cooperating objects that creates accounting document cooperating objects for exchange between business partners to effectuate payment with respect to the Debt Management Items class of cooperating objects.

20. A program product data storage device, tangibly embodying a program of machine-readable instructions executable by a computer system having an operating system that supports an object oriented programming environment, the program product comprising:

a recordable media; and an object oriented framework recorded on the recordable media, the object oriented framework comprising a set of object oriented classes including at least one user-extensible class that a user of the framework can extend using object oriented principles of inheritance to define a business financial account management application, the framework comprising a Ledger Account Application category of cooperating objects that contain business financial accounts data and perform accounts receivables and accounts payable operations on the business financial accounts data, wherein the Ledger Account Application category of cooperating objects comprises an Account object class that specifies an account structure for containing accounts receivables, accounts payable, company identification, and business partner identification data to specify the business financial accounts data, wherein the framework further comprises a Debt Management Items category of cooperating objects that reference transactions between the company and a business partner and a Log Entry category of cooperating objects that identifies the transaction prior to a commit operation on the transaction.

21. A method as defined in claim 15, further including a Payments category of cooperating objects that permits selection of payment transactions to be made to business partners and grouping of such payments.

22. A method as defined in claim 21, wherein the Payments category includes a Manual Payments Control class that creates an accounts receivable/accounts payable transaction entry and causes it to be paid immediately in a single step.

23. A program product as defined in claim 20, wherein the Debt Management Items category further includes a Posting Combination class that identifies a general ledger account against which an installment payment will be applied.

24. A program product as defined in claim 20, further including a Log Entry category of cooperating objects that identifies a transaction with respect to a Ledger object class of cooperating objects.

25. A program product as defined in claim 20, further including a Batch category of cooperating objects that identifies a group of transactions for joint processing, including start, suspend, restart, and commit operations.

26. A program product as defined in claim 20, further including a Payments category of cooperating objects that permits selection of payment transactions to be made to business partners and grouping of such payments.

27. A program product as defined in claim 26, wherein the Payments category includes a Manual Payments Control class that creates an accounts receivable/accounts payable transaction entry and causes it to be paid immediately in a single step.

28. A program product as defined in claim 20, further including a Collection Documents category of cooperating objects that creates accounting document cooperating objects for exchange between business partners to effectuate payment with respect to the Debt Management Items class of cooperating objects.

29. A computer-implemented method of distributing a program product, the method comprising the steps of:

establishing a connection between a first computer system and a second computer system; and transmitting the program product from the first computer system to the second computer system, wherein the program product comprises an object oriented framework, the object oriented framework comprising a set of object oriented classes including at least one user-extensible class that a user of the framework can extend using object oriented principles of inheritance to define a business financial account management application, the framework comprising a Ledger Account Application category of cooperating objects that contain business financial accounts data and perform accounts receivables and accounts payable operations on the business financial accounts data, wherein the Ledger Account Application category of cooperating objects comprises an Account object class that specifies an account structure for containing accounts receivables, accounts payable, company identification, and business partner identification data to specify the business financial accounts data, wherein the framework further comprises a Debt Management Items category of cooperating objects that reference transactions between the company and a business partner, and a Log Entry category of cooperating objects that identifies the transaction prior to a commit operation on the transaction.

30. A method as defined in claim 29, further including a Payments category of cooperating objects that permits selection of payment transactions to be made to business partners and grouping of such payments.

31. A method as defined in claim 30, wherein the Payments category includes a Manual Payments Control class that creates an accounts receivable/accounts payable transaction entry and causes it to be paid immediately in a single step.

32. A method as defined in claim 29, wherein the Debt Management Items category further includes a Posting Combination class that identifies a general ledger account against which an installment payment will be applied.

33. A method as defined in claim 29, further including a Log Entry category of cooperating objects that identifies a transaction with respect to a Ledger object class of cooperating objects.

34. A method as defined in claim 29, further including a Batch category of cooperating objects that identifies a group of transactions for joint processing, including start, suspend, restart, and commit operations.

35. A method as defined in claim 29, further including a Collection Documents category of cooperating objects that creates accounting document cooperating objects for exchange between business partners to effectuate payment with respect to the Debt Management Items class of cooperating objects.

* * * * *